United States Patent
Lee et al.

(10) Patent No.: US 10,528,226 B2
(45) Date of Patent: Jan. 7, 2020

(54) DISPLAY APPARATUS, USER TERMINAL, CONTROL METHOD, AND COMPUTER-READABLE MEDIUM

(71) Applicant: SAMSUNG ELECTRONICS CO., LTD., Suwon-si (KR)

(72) Inventors: Jin-ha Lee, Seoul (KR); Min-ha Yang, Seoul (KR); Jong-bo Moon, Suwon-si (KR); Da-hye Shim, Seoul (KR); Ji-hong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 15/391,990

(22) Filed: Dec. 28, 2016

(65) Prior Publication Data
US 2017/0192631 A1    Jul. 6, 2017

(30) Foreign Application Priority Data

Dec. 30, 2015 (KR) .................. 10-2015-0189973

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0346* (2013.01); *G06F 3/0488* (2013.01);
(Continued)

(58) Field of Classification Search
CPC ............................ H04N 21/4622; G06F 16/29
See application file for complete search history.

(56) References Cited

U.S. PATENT DOCUMENTS 5,734,853 A * 3/1998 Hendricks .............. H04H 20/06
                                                             348/E5.002
5,796,396 A    8/1998 Rich
(Continued)

FOREIGN PATENT DOCUMENTS

| KR | 1020050036281 A | 4/2005 |
| KR | 1020080087997 A | 10/2008 |
| WO | 2015093637 A1 | 6/2015 |

OTHER PUBLICATIONS

Michael Gorman "Google Chromecast review: can you make your dumb TV a smart one for just $35?" endgadget.com Jul. 29, 2013, [retrieved from the Internet Jun. 26, 2018: URL:https://web.archive.org/web/20130729171932/https://www.engadget.com/2013/07/29/google-chromecast-review/ ]XP055487793 & Anonymous: "Chromecast: How to cast using You Tube" Aug. 29, 2013, [Retrieved from the Internet Jun. 26, 2018 URL:https://www.youtube.com/watch?v=RKIUPQCXnsM ] XP055487916 (6 pages total).

(Continued)

*Primary Examiner* — Claudia Dragoescu
(74) *Attorney, Agent, or Firm* — Sughrue Mion, PLLC

(57) ABSTRACT

A display apparatus includes: a display; a communication device configured to communicate with a user terminals; and a processor configured to control the display to display a UI, which includes items corresponding to content to be shared by users, in response to inputs of the users received through the user terminals, and control the display to display, on the UI, reproduction control states of the content to be distinguishable according to the respective users.

21 Claims, 23 Drawing Sheets

(51) Int. Cl.
*G06F 3/0346* (2013.01)
*G06F 3/0481* (2013.01)
*G06F 3/0484* (2013.01)
*G06F 3/0488* (2013.01)
*G06F 3/14* (2006.01)

(52) U.S. Cl.
CPC ...... *G06F 3/04812* (2013.01); *G06F 3/04845* (2013.01); *G06F 3/14* (2013.01)

(56) References Cited

U.S. PATENT DOCUMENTS

| | | | | |
|---|---|---|---|---|
| 8,660,545 | B1* | 2/2014 | Redford | H04W 4/50 455/418 |
| 9,013,540 | B2 | 4/2015 | Tseng et al. | |
| 2002/0059308 | A1 | 5/2002 | Kawashima et al. | |
| 2005/0235209 | A1* | 10/2005 | Morita | G06F 3/0482 715/716 |
| 2007/0106950 | A1* | 5/2007 | Hutchinson | G09B 5/067 715/761 |
| 2008/0115190 | A1* | 5/2008 | Aaron | H04L 63/0227 726/1 |
| 2009/0015672 | A1* | 1/2009 | Clapp | G06F 17/30796 348/143 |
| 2009/0307633 | A1* | 12/2009 | Haughay, Jr. | G06F 1/1626 715/841 |
| 2009/0323586 | A1* | 12/2009 | Hohl | H04B 5/0031 370/328 |
| 2010/0062753 | A1* | 3/2010 | Wen | H04M 1/27455 455/418 |
| 2010/0192107 | A1 | 7/2010 | Takahashi | |
| 2011/0113097 | A1* | 5/2011 | Takeuchi | H04N 1/00183 709/204 |
| 2012/0124677 | A1* | 5/2012 | Hoogerwerf | G06F 3/04883 726/29 |
| 2013/0238702 | A1 | 9/2013 | Sheth et al. | |
| 2014/0340309 | A1 | 11/2014 | Kim et al. | |
| 2015/0097757 | A1 | 4/2015 | Bang et al. | |
| 2015/0113432 | A1 | 4/2015 | Jung et al. | |
| 2015/0138082 | A1 | 5/2015 | Nagata | |
| 2015/0193124 | A1* | 7/2015 | Schwesinger | G06F 3/017 715/863 |
| 2016/0150575 | A1* | 5/2016 | Andersen | H04W 76/10 370/329 |

OTHER PUBLICATIONS

Communication dated Jul. 4, 2018, from the European Patent Office in counterpart European Application No. 16882023.1.
Communication dated Apr. 19, 2017, issued by the International Searching Authority in counterpart International Application No. PCT/KR2016/015070 (PCT/ISA/210).

* cited by examiner

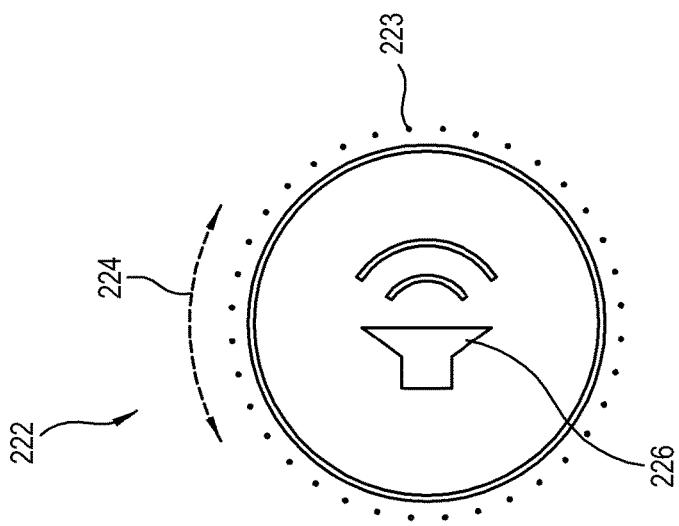
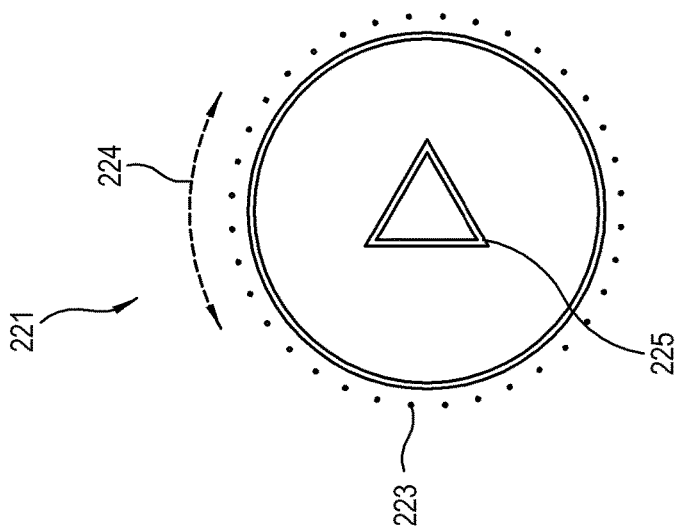
FIG. 23

DISPLAY APPARATUS, USER TERMINAL, CONTROL METHOD, AND COMPUTER-READABLE MEDIUM

CROSS-REFERENCE TO RELATED APPLICATION

This application claims priority from Korean Patent Application No. 10-2015-0189973, filed on Dec. 30, 2015 in the Korean Intellectual Property Office, the disclosure of which is incorporated herein by reference in its entirety.

BACKGROUND

1. Field

Apparatuses and methods consistent with exemplary embodiments relate to a display apparatus and a user terminal which are capable of reproducing content, a control method thereof, a computer-readable medium and a system thereof, and more particularly to a display apparatus and a user terminal which are capable of reproducing content desired to be shared among a plurality of users in response to inputs of the plurality of users, a control method thereof, a computer-readable medium and a system thereof.

2. Description of the Related Art

In related art methods for sharing content among a plurality of users, the plurality of users can connect their own smartphones or similar user terminals to a television (TV) or the display apparatus one by one in turn, so that content of the smartphone can be displayed on the display apparatus, thereby sharing content with one another.

However, the related art technology is not sufficient to provide a worthwhile experience of sharing content to the plurality of users who are in the same place. For example, if several users who took a trip together share pictures respectively taken by them, the related art methods may be inconvenient since the users have to connect their own user terminals to the display apparatus in turn. Further, the functions provided by the related art display apparatus or user terminal have certain limits to make an experience of sharing content be valuable to users.

SUMMARY

One or more exemplary embodiments may overcome the above disadvantages and other disadvantages not described above. However, an exemplary embodiment is not required to overcome the disadvantages described above, and may not overcome any of the problems described above.

One or more exemplary embodiments may provide a display apparatus and a user terminal, a control method thereof, a computer-readable medium and a system thereof, in which various, convenient and interesting interfaces for sharing content are provided to a plurality of users, so that they can experience worthwhile sharing activities.

In accordance with an aspect of an exemplary embodiment, there is provided a display apparatus including: a display; a communicator configured to communicate with a plurality of user terminals; and a controller configured to display on the display a user interface (UI), which includes a plurality of items corresponding to a content to be shared by a plurality of users, in response to inputs of the plurality of users received through the plurality of user terminals, and control the UI to display reproduction control states of the content to be distinguishable according to the plurality of users.

The controller may control the plurality of items to be displayed distinguishably by colors respectively assigned to the plurality of users.

The controller may control the UI to display a visualizer provided distinguishably according to the plurality of users and varied in visual effect depending states of the input of the user.

The controller may control the UI to further display a cursor for selecting the item and make the cursor be changed in shape as the item is selected or unselected by the input of the user.

The controller may control the UI to further display a wallpaper image and arrange the item at a certain position matching with the content corresponding to the item on the wallpaper image.

The controller may control the item to additionally display a timer showing a lapse of a standby time in response to a request for reproducing the content from the user, and starts reproducing the content when the standby time is over.

The controller may control the standby time to become shorter as more users make a request for reproducing the content.

The controller may control the timer to become bigger as more users make a request for reproducing the content.

The controller may control the UI to further display an item of an album including two or more pieces of content selected by the input of the user, and control the item of the album to display information about users corresponding to the pieces of content included in the album.

In accordance with an aspect of an exemplary embodiment, there is provided a method of controlling a display apparatus, the method including: connecting and communicating with a plurality of user terminals; displaying a user interface (UI), which includes a plurality of items corresponding to a content to be shared by a plurality of users, in response to inputs of the plurality of users received through the plurality of user terminals; and controlling the UI to display reproduction control states of the content to be distinguishable according to the plurality of users.

The controlling the UI may include controlling the plurality of items to be displayed distinguishably by colors respectively assigned to the plurality of users.

The controlling the UI may include controlling the UI to display a visualizer provided distinguishably according to the plurality of users and varied in visual effect depending states of the input of the user.

The controlling the UI may include controlling the UI to further display a wallpaper image and arrange the item at a certain position matching with the content corresponding to the item on the wallpaper image.

The controlling the UI may include controlling the item to additionally display a timer showing a lapse of a standby time in response to a request for reproducing the content from the user, and starting reproducing the content when the standby time is over.

In accordance with an aspect of an exemplary embodiment, there is provided a user terminal including: a display configured to include a touch screen for receiving a touch input of a user; a communicator configured to communicate with a display apparatus; and a controller configured to control the display to display a first user interface (UI) for selecting content to be shared with another user through a display apparatus, transmit information about the content selected by the touch input using the first UI to the display apparatus, display a second UI including a cursor for controlling reproduction of the content corresponding to an item displayed on the display apparatus, and transmit the touch input using the cursor to the display apparatus.

The user terminal may further include a sensor configured to sense inclination of the user terminal, wherein the first UI may include the item corresponding to the content, and the controller may display the item selected to be shared to move to an edge of the first UI in response to the inclination of the user terminal.

The controller may control the cursor to be changed in size as the item displayed on the display apparatus is selected or unselected.

The first UI may provide a first search function for searching a storage where data of the content is stored, the second UI may provide a second search function for searching the content corresponding to the item displayed on the display apparatus, and the controller may transmit the touch input using at least one of the first search function and the second search function to the display apparatus.

In accordance with an aspect of an exemplary embodiment, there is provided a computer-readable medium storing a computer program to be executed by a user terminal including a touch screen for receiving a touch input of a user, wherein operations of the user terminal by the execution of the computer program includes: connecting and communicating with a display apparatus; displaying a first user interface (UI) for selecting content to be shared with another user through the display apparatus; transmitting information about the content selected by the touch input using the first UI to the display apparatus; displaying a second UI including a cursor for controlling reproduction of the content corresponding to an item displayed on the display apparatus; and transmitting the touch input using the cursor to the display apparatus.

In accordance with an aspect of an exemplary embodiment, there is provided an apparatus for sharing content among a plurality of users, the apparatus including: a display apparatus configured to display a user interface (UI), which includes a plurality of items corresponding to content to be shared by the plurality of users, in response to inputs of the plurality of users, and control the UI to display reproduction control states of the content to be distinguishable according to the plurality of users; and a plurality of user terminals configured to display a first UI for selecting content to be shared, transmit information about the content selected by the input of the user using the first UI to the display apparatus, display a second UI for controlling reproduction of the content corresponding to the item displayed on the display apparatus, and transmit the input of the user using the second UI to the display apparatus.

BRIEF DESCRIPTION OF THE DRAWINGS

The above and/or other aspects will become more apparent by describing certain exemplary embodiments, with reference to the accompanying drawings, in which:

FIG. 23 is an example of the UI displayed on the user terminal according to an exemplary embodiment.

DETAILED DESCRIPTION OF EXEMPLARY EMBODIMENTS

Figure 1:
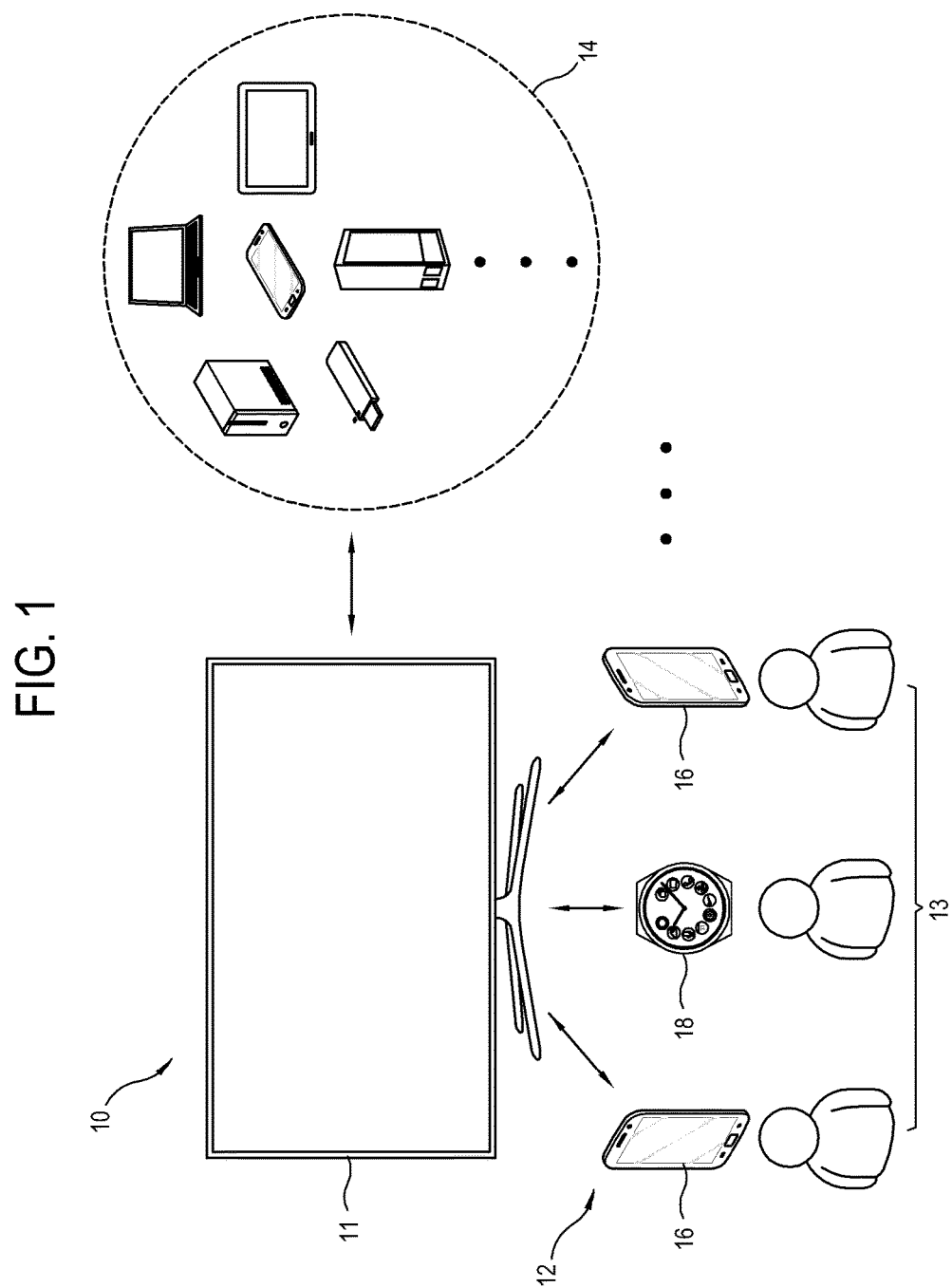
FIG. 1 illustrates a display apparatus and a user terminal according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 illustrates an apparatus 10 for sharing content, including a display apparatus 11 and a user terminal or terminals 12 according to an exemplary embodiment. The display apparatus 11 shown in FIG. 1 may include a television (TV), a monitor, a large format display, etc., but not limited thereto. The display apparatus according to an exemplary embodiment may also include a digital signage, a large billboard, an in-vehicle monitor, a head-mount display, a virtual reality device, etc. Each user terminal 12 shown in FIG. 1 may be a smartphone 16, a smartwatch 18, a smart pad, a personal computer or the like personal device, but not limited thereto. The user terminal according to an exemplary embodiment may be an MP3 player, smart glasses, a virtual reality device, etc. Each user 13 has their own user terminal 12. Each user 13 and the user terminal 12 may be placed around the display apparatus 11. Each user 13 may control their own user terminal 12 while viewing the display apparatus 11. Each user 13 may make the display apparatus 11 provide content desired by him/her through his/her own user terminal 12.

The display apparatus 11 may provide content selected by each user in accordance with a request from each user 13 using the user terminal 12. There are no limits to the kind of content provided by the display apparatus 11, but the content may, for example, include music, a moving image, a picture, web information, etc. The users 13 may use their own user terminals 12 and the display apparatus 11 to share content selected by them. For example, the plurality of users 13 who have come back from a trip may use the display apparatus 11 to share pictures taken in the same place and at the same time. According to an exemplary embodiment, the display apparatus 11 and the user terminals 12 may allow the plurality of users 13 to share their content with one another in the same place, thereby having a new worthwhile experience of the content sharing activities.

According to an exemplary embodiment, the content sharing activities may include the following matters. That is, each user 13 may select his/her favorite content as content to be shared. For example, each user 13 may select content created by herself through the user terminal 12, content filtered based on his/her tastes, or the like as content to be shared. The users 13 may respectively manipulate their own user terminals 12 to express their preference, tastes, opinions, etc. on the display apparatus 11 while the content is being shared.

Thus, by the display apparatus 11 and the user terminals 12 according to an exemplary embodiment, a plurality of users 13 who are in the same place can share content with one another with respect to music, a moving image, a picture or the like content reflecting their interest, tests, etc. through the user terminals 12, which can be respectively manipulated by a plurality of users 13, and the display apparatus 11, which can be simultaneously viewed by the plurality of users 13, and also talk with one another while viewing a screen for sharing the content, thereby making a more worthwhile experience.

Figure 2:
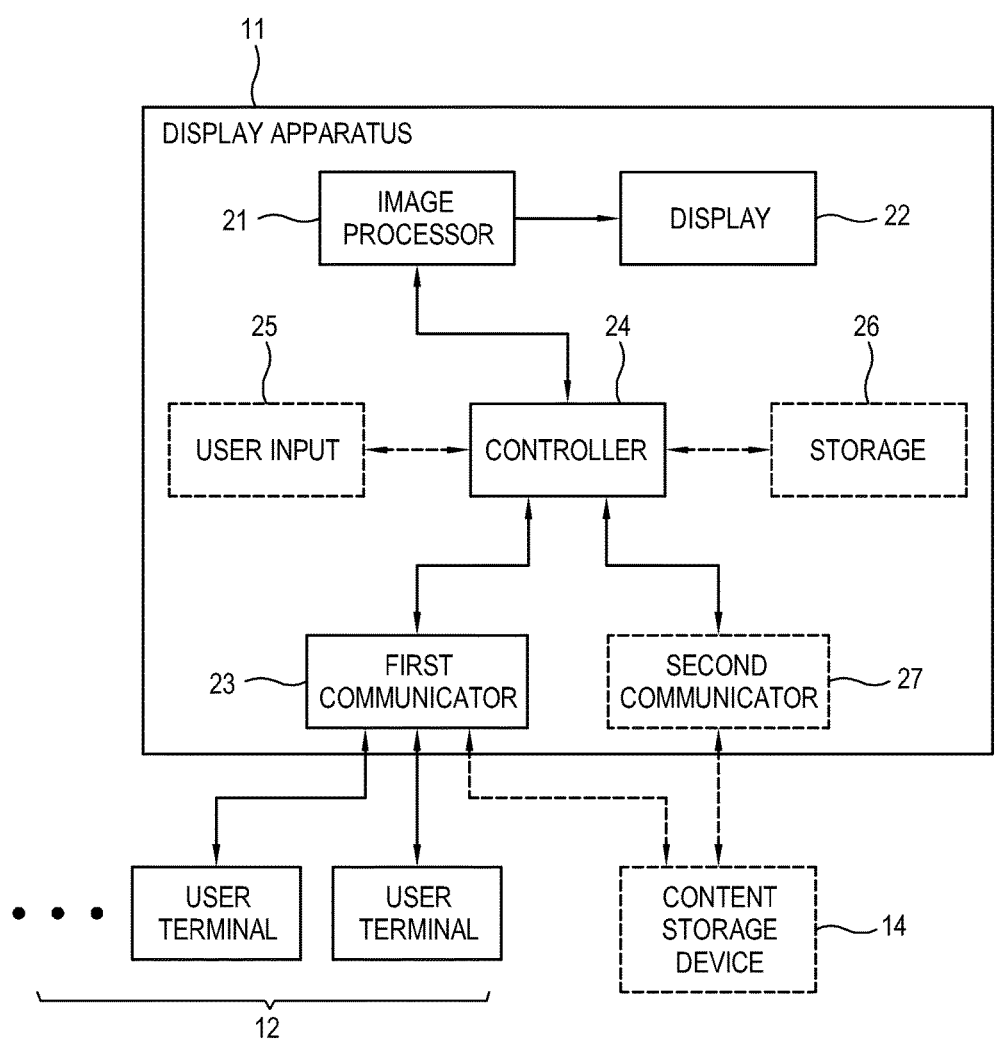
FIG. 2 is a block diagram of a display apparatus according to an exemplary embodiment.

FIG. 2 is a block diagram of the display apparatus 11 according to an exemplary embodiment. The display apparatus 11 may include an image processor 21, a display 22, a first communicator 23, e.g., a communication device, an interface, and/or a transceiver, and a controller 24, e.g., a processor and/or a microprocessor. The image processor 21 performs image processing to display a user interface (UI) for sharing content and/or an image of the content. The display 22 displays the UI and/or image processed by the image processor 21. The first communicator 23 performs communication with the user terminal 12. The controller 24 performs control for the display apparatus 11. The controller 24 performs control in response to a request of each user 13 received from the user terminal 12 so that each user 13 can do the content sharing activities.

Figure 3:
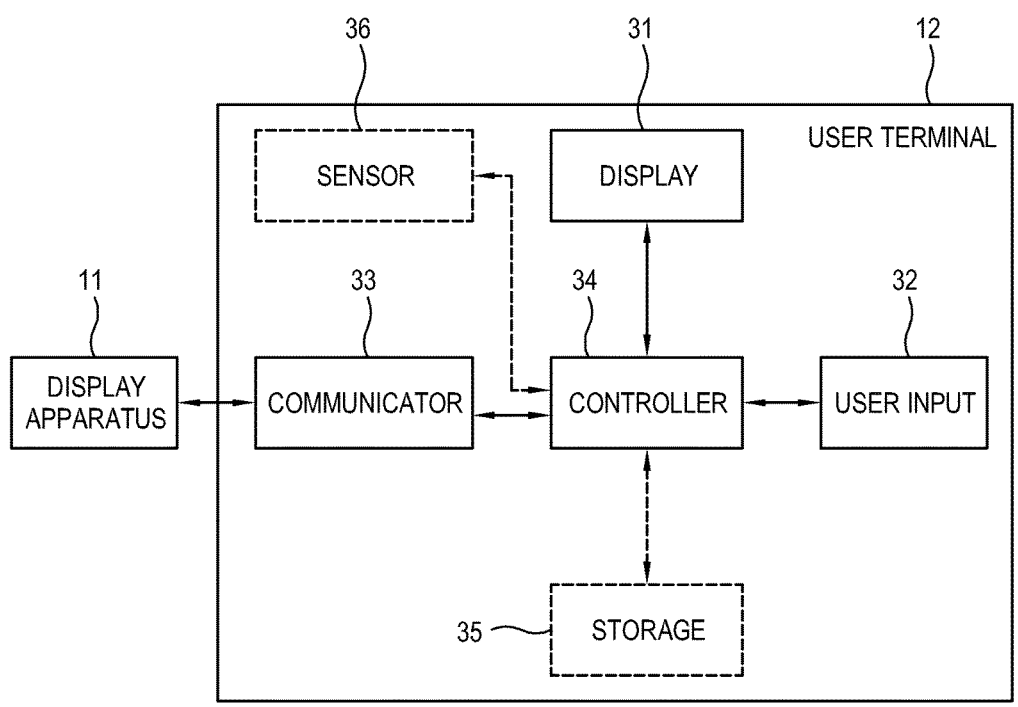
FIG. 3 is a block diagram of a user terminal according to an exemplary embodiment.

FIG. 3 is a block diagram of the user terminal 12 according to an exemplary embodiment. The user terminal 12 includes a display 31, a user input 32, a communicator 33, e.g., a communication device, an interface, and/or a transceiver, and a controller 34, e.g., a processor and/or a microprocessor. The user terminal 12 may further include a storage or a storage unit 35. The display 31 displays a UI for sharing content. The user input 32 receives a user's input for sharing content. There are no limits to the user input 32. For example, the user input 32 may include a touch screen for sensing a user's touching input on the display 31. The communicator 33 communicates with the first communicator 23 of the display apparatus 11. The controller 34 performs controls for the user terminal 12. The controller 34 controls the display 31 to display a UI for sharing content, and controls the communicator 33 to transmit a user's input received through the user input 32 to the display apparatus 11, so that a user 13 can do the content sharing activities.

There are no limits to a communication method between the first communicator 23 of the display apparatus and the communicator 33 of the user terminal 12. For example, the communication method may include wireless fidelity (Wi-Fi), Bluetooth, etc. At least one of the controller 24 of the display apparatus 11 and the controller 34 of the user terminal 12 may include a control program, a nonvolatile memory in which the control program is installed, a volatile memory to which at least a portion of the installed control program is loaded, and at least one microprocessor for executing the loaded control program. The control program may include at last one of a basic input/output system (BIOS), a device driver, an operating system, a firmware, a platform and an application programs. The application program may be installed or stored in advance in the display apparatus 11 or the user terminal 12 when the display apparatus 11 or the user terminal 12 is manufactured, or may be installed in the display apparatus 11 or the user terminal 12 based on received data by receiving data of application programs from the outside when it is used in the future. The data of the application program may be, for example, downloaded from an external server such as an application market to the display apparatus 11 or the user terminal 12.

Figure 4:
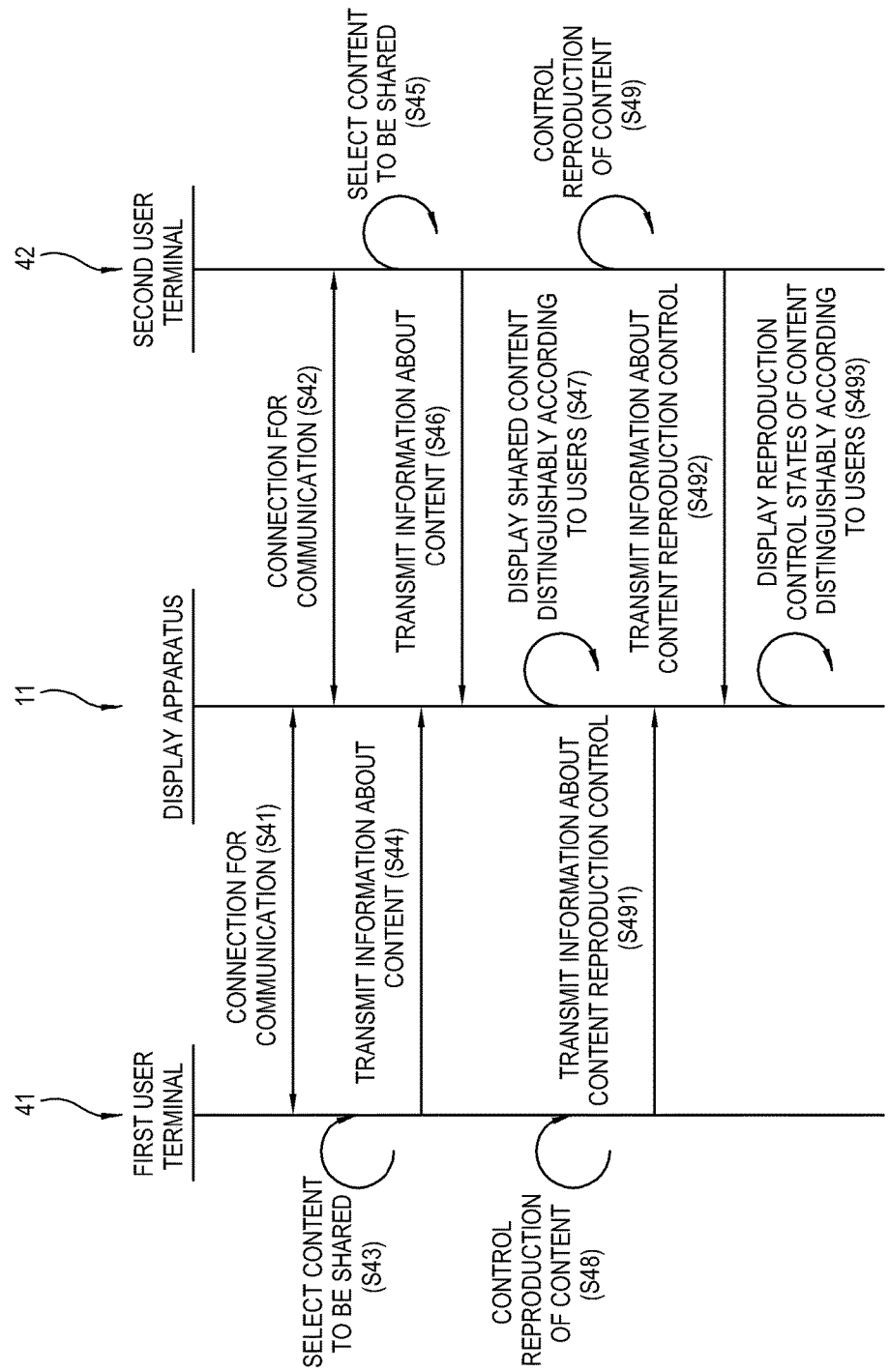
FIG. 4 illustrates operations between a display apparatus and user terminals according to an exemplary embodiment.

FIG. 4 illustrates operations between the display apparatus 11 and the user terminals 12 according to an exemplary embodiment. A first user terminal 41 and a second user terminal 42 shown in FIG. 4 respectively refer to two user terminals 12 among the plurality of user terminals 12 shown in FIG. 1 to FIG. 3. For convenience of description, FIG. 4 illustrates only two user terminals 12 among the plurality of user terminals 12 as an example. According to an exemplary embodiment, three or more user terminals are also possible. First, the first user terminal 41 is connected to and starts communication with the display apparatus 11 (S41). Any one of the first user terminal 41 and the display apparatus 11 may lead the communication between the first user terminal 41 and the display apparatus 11.

If the first user terminal 41 takes the lead of the communication, the first user terminal 41 may, for example, receive a user's input for starting the content sharing activities from a user 13 through the UI displayed on the display 31. The first user terminal 41 searches for connectable devices around the first user terminal 41 through the UI in accordance with a user's input for starting the content sharing activities. If the display apparatus 11 is found as a connectable device, the first user terminal 41 may connect and communicate with the found display apparatus 11. In this case, the display apparatus 11 may connect the first user terminal 41 when it receives a request for searching the connectable devices from the first user terminal 41.

Specifically, the first user terminal 41 may determine whether to connect and communicate with the found display apparatus 11 based on information about identification (ID) of the display apparatus 11, such as device ID. In this case, the display apparatus 11 may transmit its own ID information to the first user terminal 41 if it receives the request for searching devices from the first user terminal 41. The first user terminal 41 may further include a storage 35 for pre-storing the ID information of the display apparatus to be connected for communication, and compares the ID information of the display apparatus stored in the storage 35 with the ID information received from the found display apparatus 11, thereby determining whether to connect and communicate with the display apparatus 11.

According to an exemplary embodiment, the first user terminal 41 may determine whether to connect and communicate with the found display apparatus 11 in accordance with a user's input. Specifically, the first user terminal 41 displays the information about the found display apparatus 11 such as a device name, device descriptions, etc. and a message of asking whether to connect with the display apparatus 11 on the display 31, and determines whether to connect and communicate with the display apparatus 11 in accordance with a user's input received through the user input 32. The first user terminal 41 may connect with the display apparatus 11 by a touch using near field communication (NFC) with the display apparatus 11 or a remote controller (to be described later) of the display apparatus 11.

On the other hand, the display apparatus 11 may take the lead of the communication between the first user terminal 41 and the display apparatus 11. The communication led by the display apparatus 11 may be also achieved like the foregoing case where the first user terminal 41 takes the lead of the communication. In this case, the display apparatus 11 may further include a user input 25 (see FIG. 2) for receiving a user's input for starting the content sharing activities. The user input 25 of the display apparatus 11 may include a panel input portion provided in the main body of the display apparatus 11 and directly receiving a user's input, and/or a remote signal receiver for receiving a remote control signal corresponding to a user's input from a remote controller for receiving the user's input. The display apparatus 11 may further include a storage or a storage unit 26 (see FIG. 2) for storing in advance the ID information of the user terminal to be connected for communication.

Referring back to FIG. 4, the second user terminal 42 connects and communicates with the display apparatus 11 (S42). The communication between the second user terminal 42 and the display apparatus 11 may be achieved like the foregoing communication between the first user terminal 41 and the display apparatus 11. Alternatively, the second user terminal 42 receives information about connection with the display apparatus 11 from the first user terminal 41, and thus connects with the display apparatus 11 based on the received connection information. Alternatively, the second user terminal 42 may provide information about the connection with the second user terminal 42 to the first user terminal 41, and thus allows the first user terminal 41 to send the connection information to the display apparatus 11, thereby allowing the display apparatus 11 to connect with the second user terminal 42.

Alternatively, one user 13 may use two or more user terminals 12. For example, one user 13 may use his/her own smartphone and smartwatch as the user terminals 12. In this case, the smartphone of the user terminal 12 may be used to connect with the display apparatus 11 in the name of a certain user, and then the smartwatch of the user terminal 12 may be used to connect with the display apparatus 11 in the name of the same user as above. The user terminal 12 of the smartwatch may, for example, use Bluetooth or the like communication method to connect with and share information with the user terminal 12 of the smartphone, and use Wi-Fi to connect with the display apparatus 11. If one user uses two or more user terminals 12, the display apparatus 11 may display the users and content control states with respect to the two or more user terminals 12, or may differently display the content control states according to the user terminals 12.

Next, the first user terminal 41 selects content to be shared (S43). The first user terminal 41 displays a UI for allowing a user 13 to select desired content on the display 31.

Figure 5:
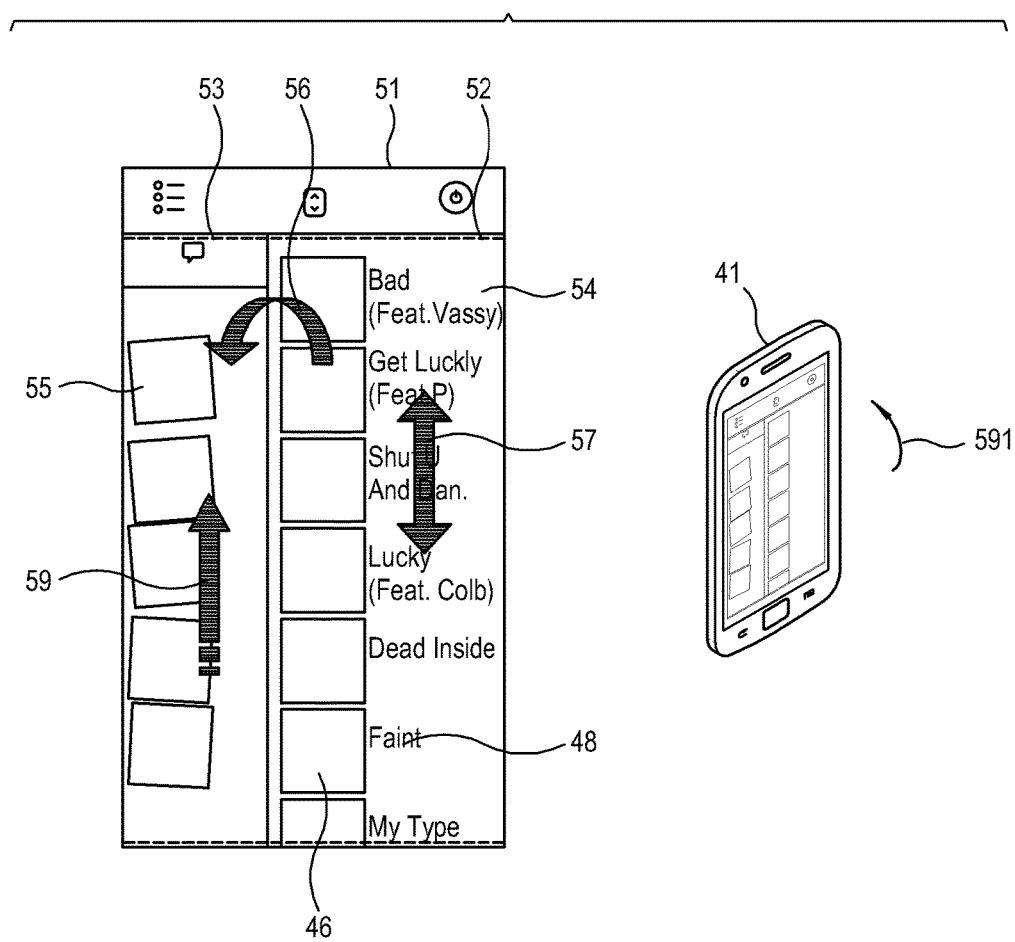
FIG. 5 shows an example of a user interface (UI) displayed on a user terminal according to an exemplary embodiment.

FIG. 5 shows an example of the UI displayed on the user terminal 41 according to an exemplary embodiment. A UI 51 shown in FIG. 5 includes a first area 52 showing one or more items 54 corresponding pieces of content selectable as the content to be shared, and a second area 53 showing an item 55 corresponding to the content selected as the content to be shared. The display of the items 54 and the item 55 may include displaying information about the corresponding content, for example, at least one among a thumbnail image, a name, descriptions, and the like of the content. As shown in FIG. 5, the items 54 may be displayed as icons 46 and corresponding content titles 48.

A user 13 may make an input by touching the first area 52 to search for the content to be shared, which may be stored, for example, in a storage. For example, the first user terminal 41 may have a first search function which may be executed via a touch input received through the UI displayed on the first area 52. For example, the first user terminal 41 moves the items 54 of the content shown on the first area 52 up and down as a user makes an input 57 of sliding up and down on the first area 52, and thus the item 54 corresponding to content not shown on the first area 52 additionally appears.

A user 13 may move content, which is desired to be shared among a plurality of pieces of content respectively indicated by the items 54 shown on the first area 52, to the second area 53. For example, if a user 13 makes an input 56, e.g., on the icon 46 or corresponding content title 48, of dragging and dropping the item 54 of certain content from the first area 52 to the second area 53, the first user terminal 41 may move the item 54 of the corresponding content to the second area 53. Then, the first user terminal 41 displays an item 55 of content corresponding to the moving item 54 to additionally appear on the second area 53. Alternatively, the user input 32 of the first user terminal 41 may sense strength (pressure) of a touch input on the display 31 through a predetermined range, and the first user terminal 41 displays the item 54 of content to be moved to the second area 53 when it is pressed with strength stronger than a predetermined level in the state that the item 54 corresponding to the content is touched and held. The first user terminal 41 may further include a sensor 36 (see FIG. 3) for sensing a motion or inclination of the first user terminal 41, and display the item 54 of content to be moved to the second area 53 when the first user terminal 41 is moved by a preset pattern or inclined in the state that a user 13 touches and holds the item 54 of the content.

According to an exemplary embodiment, if a user 13 moves the item 54 of content from the first area 52 to the second area 53, the first user terminal 41 may determine that the corresponding content is selected to be shared. In this case, the first user terminal 41 may display the item 55 of the content to be moved in a direction 59 toward the edge area of the UI 51 in response to that the item 55 of new content is added to the second area 53. At this time, if the item 55 of content reaches the top end of the second area 53, the item 55 disappears from the second area 53.

According to an exemplary embodiment, if there is an input of a user 13 following after the item 55 of new content is added to the second area 53, the first user terminal 41 may determine that the content corresponding to the item 55 displayed on the second area 53 is selected to be shared. For example, if a user makes an input for inclining the first user terminal 41 toward the display apparatus 11, i.e., in an upward direction 591, the first user terminal 41 may determine that a user selects the content of the second area 53 to be shared. The first user terminal 41 may display the item 55 of the content shown in the second area 53 to be moved in the upper direction 59 as the first user terminal 41 is inclined in the upward direction 591. The item 55 of the content, reaches the top end of the second area 53 disappears from the second area 53. Accordingly, a user may see visual effects as if the content desired to be shared is moved or poured out from the first user terminal 41 to the display apparatus 11.

Referring back to FIG. 4, if the content to be shared is selected, the first user terminal 41 transmits information about the selected content to the display apparatus 11 (S44). Similarly, the second user terminal 42 selects content to be shared in accordance with a user's input (S45) and transmits information about the selected content to the display apparatus 11 (S46).

The display apparatus 11 may display content to be shared based on the information about the content, received from the first user terminal 41 and the second user terminal 42

(S47). The display apparatus 11 may display the shared content according to the respective users 13.

Figure 6:
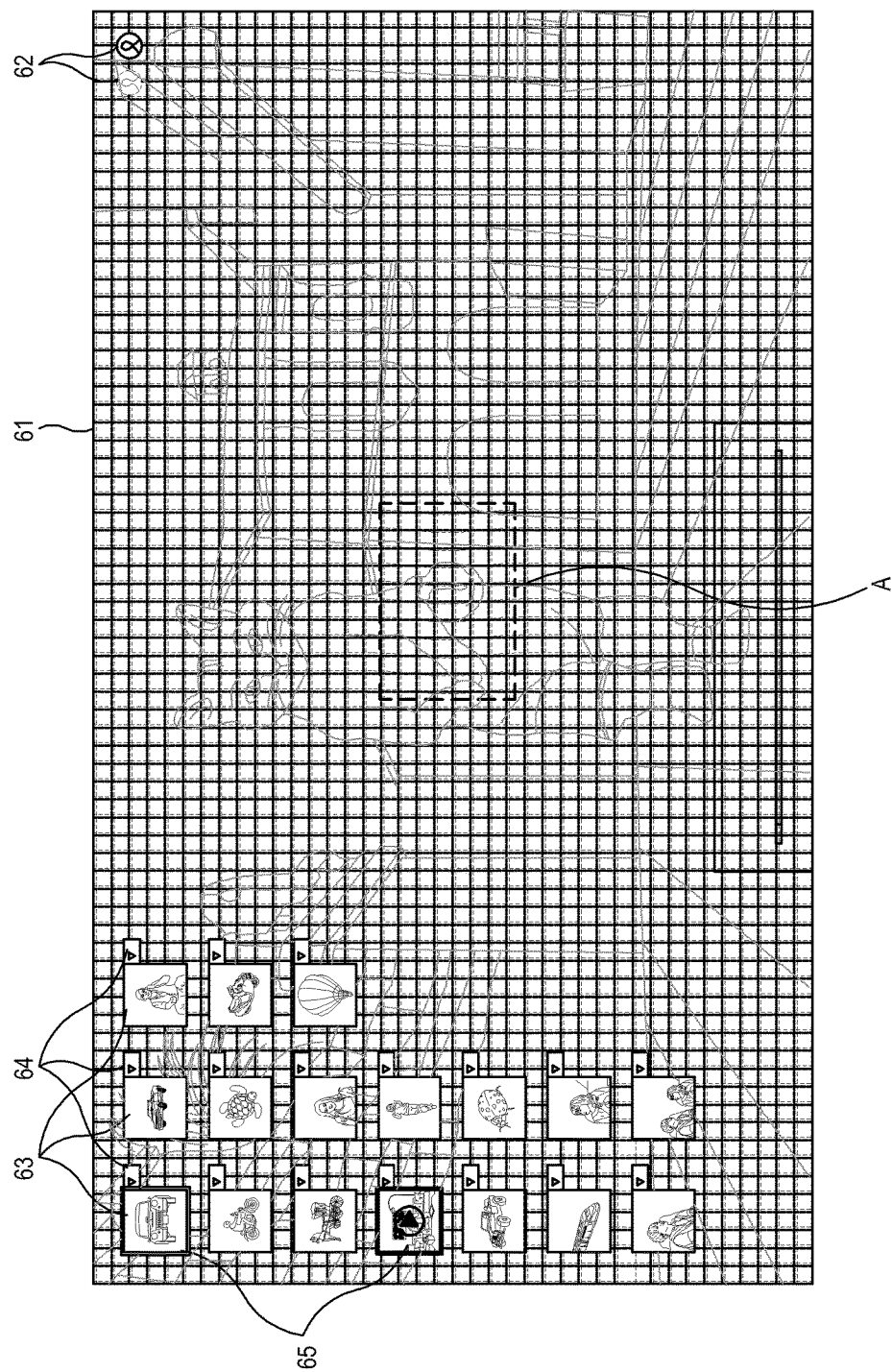
FIG. 6 shows an example of a UI displayed on a display apparatus according to an exemplary embodiment.

FIG. 6 shows an example of a UI displayed on the display apparatus 11 according to an exemplary embodiment. The UI 61 shown in FIG. 6 may include an item or items 62 showing users who share the content, and an item or items 63 showing the shared content. The item 62 showing users 13 who share the content with each other refers to the users 13 of the first user terminal 41 and the second user terminal 42 which are currently connected to the display apparatus 11. The item 62 showing users 13 who share content with each other may, for example, distinguish the users 13 by colors, names, IDs, etc. When the first user terminal 41 or the second user terminal 42 is connected to the display apparatus 11, the display apparatus 11 may assign different colors to users 13 of the connected first user terminal 41 and the connected second user terminal 42. The display apparatus 11 may transmit information about colors respectively assigned to users 13 to the first user terminal 41 or the second user terminal 42 of the corresponding user 13.

The display apparatus 11 may display the item 63 of the shared content as the information about the shared content is received from the first user terminal 41 and/or the second user terminal 42 (S44, S46). The display apparatus 11 may display the item 63 of the shared content to appear on the UI 61 as if it is moving in a predetermined direction. For example, the item 63 of the shared content may appear on the UI 61 as if it is moving from right to left or from left to right. The display apparatus 11 may display the item 63 of the shared content to enter the UI 61 as if it falls from the top end of the UI 61 downward or as if it rises from the bottom upward. Thus, more emphasized visual effects are given as if the content is poured out from the first user terminal 41 and/or the second user terminal 42 to the display apparatus 11.

The item 63 showing the shared content may include the thumbnail image, the name, the descriptions, etc. of the shared content. The item 63 showing the shared content may be distinguished according to users 13 by the color assigned to the user 13 of the corresponding content. Therefore, the user 13 can easily recognize which user 13 shares the content through his/her own terminal, based on what color the item of the shared content displayed on the display apparatus 11 has.

Each user 13 may use his/her own first user terminal 41 or second user terminal 42 to control the shared content displayed on the display apparatus 11. The operations of the first user terminal 41 and the second user terminal 42 may be similar to each other. For convenience of description, the operations of the first user terminal 41 will be representatively described.

Figure 7:
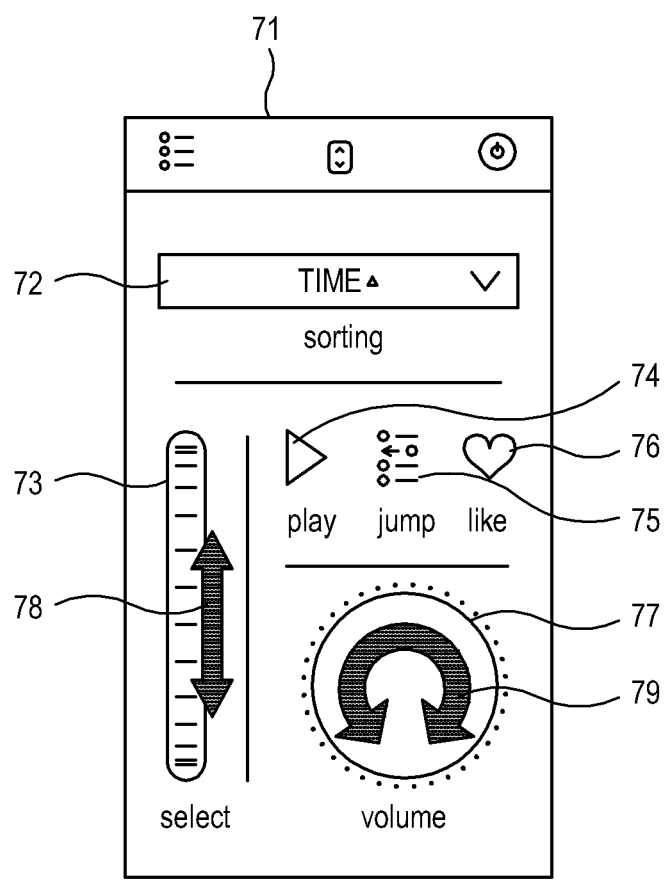
FIGS. 7 and 8 illustrate UIs displayed on a user terminal according to an exemplary embodiment.

FIG. 7 illustrates an example of a UI displayed on the first user terminal 41 according to an exemplary embodiment. The UI 71 shown in FIG. 7 may include an item 72 for sorting the shared content displayed on the display apparatus 11, an item 73 for navigating the shared content, an item 74 for starting reproduction of the shared content, an item 75 for skipping to the next shared content, an item 76 for voting for the shared content, and an item 77 for controlling volume of the shared content being reproduced. According to an exemplary embodiment, the first user terminal 41 may display the UI 71 with a color assigned to a corresponding user 13 based on the information received from the display apparatus 11. Thus, a user 13 can easily know the color that he/she has been given.

The user 13 selects one among the plurality of items 72 to 77 of the UI 71, and thus controls the reproduction of the shared content displayed on the display apparatus 11 (see S48 and S49 in FIG. 4). If a user's input such as a touch on the UI 71 selects one among the plurality of items 72 to 77 on the UI 71, the first user terminal 41 transmits reproduction-control information corresponding to the selected item (one among the items 72 to 77) to the display apparatus 11 (see S491 and S492 in FIG. 4). The display apparatus 11 displays a reproduction control state of the shared content displayed thereon based on the reproduction control information received from the first user terminal 41 (see S493 of FIG. 4). The display apparatus 11 may display the reproduction control state of the shared content distinguishably according to users 13.

Figure 8:
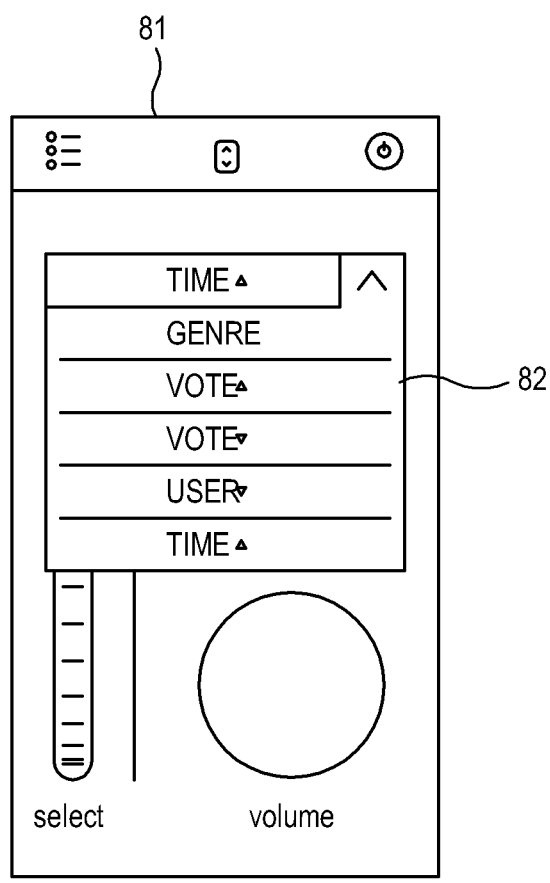

Specifically, if the item 72 for sorting the shared content is selected on the UI 71 shown in FIG. 7, the first user terminal 41 may display a UI 81 that includes a menu item 82 showing sortable categories as shown in FIG. 8. The sortable categories of the menu item 82 may, for example, include a genre of content, a user, time, a vote for, a vote against, etc. A user 13 may select one among the sortable categories of the menu item 82, thereby sorting the shared content displayed on the display apparatus 11.

Referring back to FIG. 6, the display apparatus 11 may sort and display the item 63 of the shared content in accordance with the category selected in the menu item 82 of the first user terminal 41. For example, if the category of the genre or user is selected, the display apparatus 11 may display only the item 63 of the shared content corresponding to the selected genre or user. If the category of the time is selected, the display apparatus 11 may sort the plurality of items 63 of the shared content in order of time such as year, month, day, day of the week, etc. If the category of the vote for or against is selected, the display apparatus 11 may display only the item 63 of the shared content obtaining a preference or higher than a value determined by the vote. As shown in FIG. 6, the UI 61 of the display apparatus 11 may further include an item or items 64 for showing a liking or rating with respect to each piece of the shared content.

Referring back to FIG. 7, a user 13 may navigate the shared content based on the item 73 of the UI 71 selecting the shared content to be reproduced. For example, a user may slide on the item 73 of the UI 71 in up and down directions 78. The display apparatus 11 may display the items 63 for the plurality of pieces of shared content while giving a focus on the currently selected item or items 65 as shown in FIG. 6. For example, the focuses on the respective items 65 may be distinguished from one another by different colors according to users 13 who select the corresponding items 65. The display apparatus 11 may move the focus over the items 65 of the selected shared content in accordance with a sliding direction 78 of a user's input to the item 73 of the first user terminal 41.

Referring back to FIG. 7, a user 13 may use the item 74 of the UI 71 to start reproducing the selected shared content. For example, a user 13 checks whether the shared content of the item 65 on which the display apparatus 11 is focused is content desired to be reproduced by him/her, and selects the item 74 of the UI 71, thereby starting the reproduction of the corresponding shared content. Alternatively, a user 13 may perform pressing with strength stronger than a predetermined level or dragging leftward or rightward while sliding over the item 73 in the up and down directions 78, thereby starting the reproduction of the corresponding shared content.

The display apparatus 11 may start reproducing the shared content of the currently focused item 65 in response to the selection of the item 74 of the first user terminal 41.

According to an exemplary embodiment, the display apparatus 11 may use the currently reproduced shared content as a wallpaper image of the UI 61. For example, if the currently reproduced shared content is music, the wallpaper image of the UI 61 may include an album jacket of the music or an image extracted from additional image received from an external server or the like in connection with the music.

The display apparatus 11 may receive data of the shared content to be reproduced from the first user terminal 41 of the user 13 who makes a request for the reproduction, and reproduces the corresponding shared content based on the received data. There are no limits to a method of transmitting data of the shared content to be reproduced between the display apparatus 11 and the first user terminal 41, but the data may be transmitted by a downloading method or a streaming method. Alternatively, the display apparatus 11 may receive data of the shared content to be reproduced from one or more content storage devices or units 14 other than the first user terminal 41 of the user 13 who makes the request for the reproduction. The content storage device 14 may, for example, include a personal computer (PC), a smartphone, a smart pad, a universal serial bus (USB) memory, a server, etc. as shown in FIG. 1. Referring to FIG. 2, the display apparatus 11 may receive data of the shared content to be reproduced from the content storage device 14 through the first communicator 23, or may further include a second communicator 27 (see FIG. 2) using a communication method different from the first communicator 23 to thereby receive data of the shared content to be reproduced from the content storage device 14 through the second communicator 27. The second communicator 27 may include at least one among a communication device, an interface, and a transceiver.

According to an exemplary embodiment, the first user terminal 41 provides a UI for searching the shared content, and transmits information about a searching query input through the UI to the display apparatus 11. The display apparatus 11 may search the shared content from the content storage device 14 based on the information about the query for searching the shared content, received from the first user terminal 41, and provides a user 13 with a result of searching the shared content.

The display apparatus 11 may perform data processing for reproducing the shared content. The data processing for reproducing the shared content may be implemented corresponding to the formats or attributes of the content. The display apparatus 11 may output the result of processing the data of the shared content to be reproduced. For example, the display apparatus 11 may output an audio signal of the shared content to be reproduced, or display a moving image or still image of the shared content to be reproduced. To implement such operations, the display apparatus 11 may further include at least one of an audio processor for processing audio data, and a loudspeaker for outputting an audio signal. As another example, the display apparatus 11 may send an external device a result of processing the data of the shared content to be reproduced.

Referring back to FIG. 7, a user 13 may select the item 75 of the UI 71 while the shared content is being reproduced, and skip to the next shared content. In response to the selection of the item 75 in the first user terminal 41, the display apparatus 11 starts reproducing the shared content of the item 63 next to the currently focused item 65.

A user 13 may select the item 76 of the UI 71 shown in FIG. 7 to thereby increase the liking for the desired shared content. The display apparatus 11 increases the liking for the shared content designated by a user 13 in response to the selection of the item 76 in the first user terminal 41. The display apparatus 11 stores a value corresponding to the liking for each piece of the shared content in a storage 26, and changes the value corresponding to the liking for the shared content stored in the storage 26 as a user 13 develops the liking for the shared content. The liking or the rating for the shared content may be decreased in accordance with the selection of a user 13.

A user 13 may control the volume of the shared content being reproduced, by selecting the item 77 of the UI 71 shown in FIG. 7. For example, a user 13 may slide over the item 77 in a clockwise or counterclockwise direction 79 in order to turn up or down the volume. The display apparatus 11 turns up or down the volume of the shared content, for example, music or a moving image, being currently reproduced in accordance with the sliding direction over the item 77 of the first user terminal 41.

The display apparatus 11 may display a reproduction control state of each user 13 in accordance with the shared content being reproduced. For example, the display apparatus 11 may display a visualizer having a visual effect instantly varying depending on the state where each user 13 manipulates the user terminal 41, 42 to control the reproduction of the shared content. The display apparatus 11 may distinguish the visualizers having the visual effects between the users 13.

Figure 9:
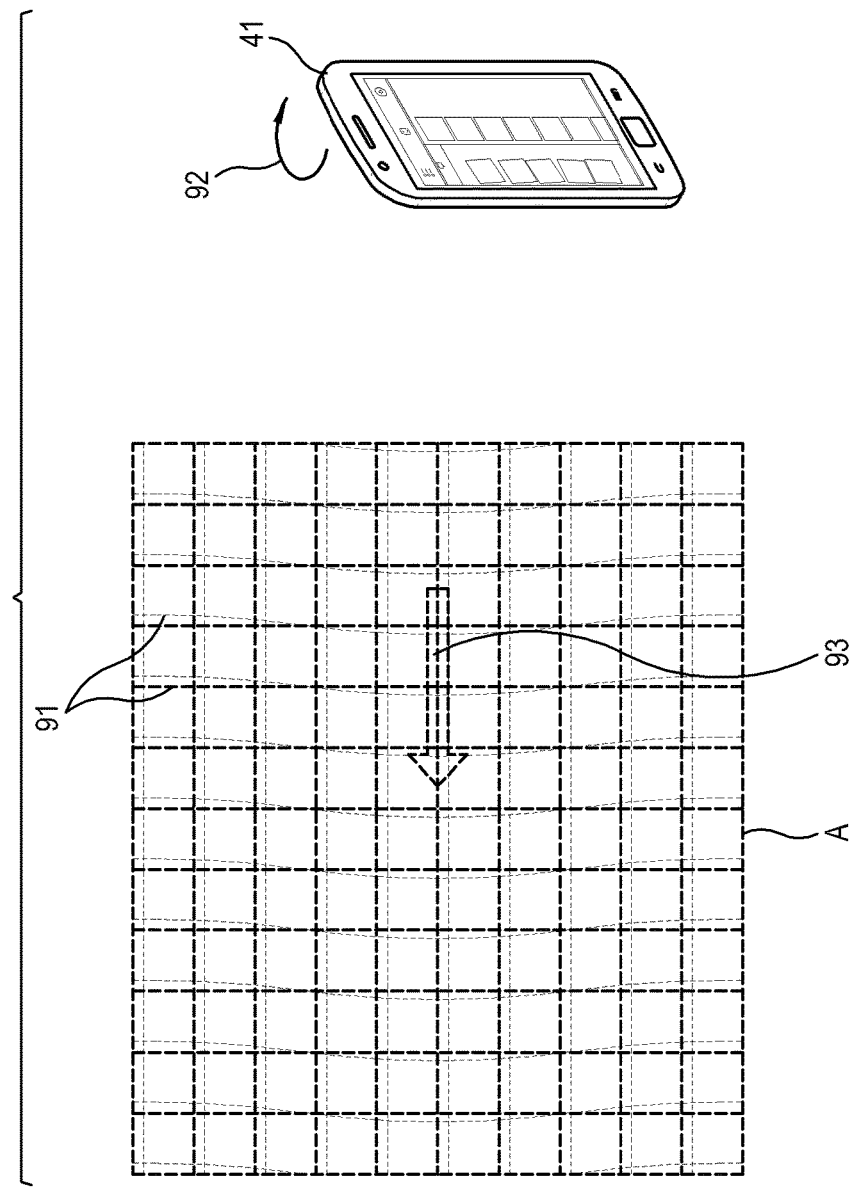
FIG. 9 is an enlarged view of an area "A" in the UI shown in FIG. 6.

FIG. 9 is an enlarged view of an area "A" in the UI 61 shown in in FIG. 6. As shown in FIG. 9, the display apparatus 11 may display a grid 91 having a lattice pattern assigned to the users 13 of the shared content as the visual effect or visualizer. Each grid 91 may be, for example, distinguished by colors according to users 13.

The display apparatus 11 receives information about a user's control state for controlling the reproduction of the shared content from each of the user terminals 41 and 42. A user's control state for reproducing the shared content may, for example, include each motion or inclination of the user terminals 41 and 42. As shown in FIG. 9, if a user 13 inclines the first user terminal 41 in a leftward direction 92 in order to control the reproduction of the shared content, the first user terminal 41 transmits information about an inclined direction 92 to the display apparatus 11. The display apparatus 11 may display the grid 91 corresponding to the first user terminal 41 to be transformed in a direction 93 corresponding to the inclined direction 92 of the first user terminal 41, based on the information received from the first user terminal 41. Thus, each user 13 can interact with the screen of the display apparatus 11 while viewing the visual effects instantly reflecting his/her control state for controlling the reproduction of the shared content, thereby getting a more interesting experience of sharing the content. The visualizer described in an exemplary embodiment is nothing but an example among methods of displaying the reproduction control state of each user 13 with respect to the shared content to be distinguished according to users. In other words, the present inventive concept is not limited to the visualizer.

Figure 10:
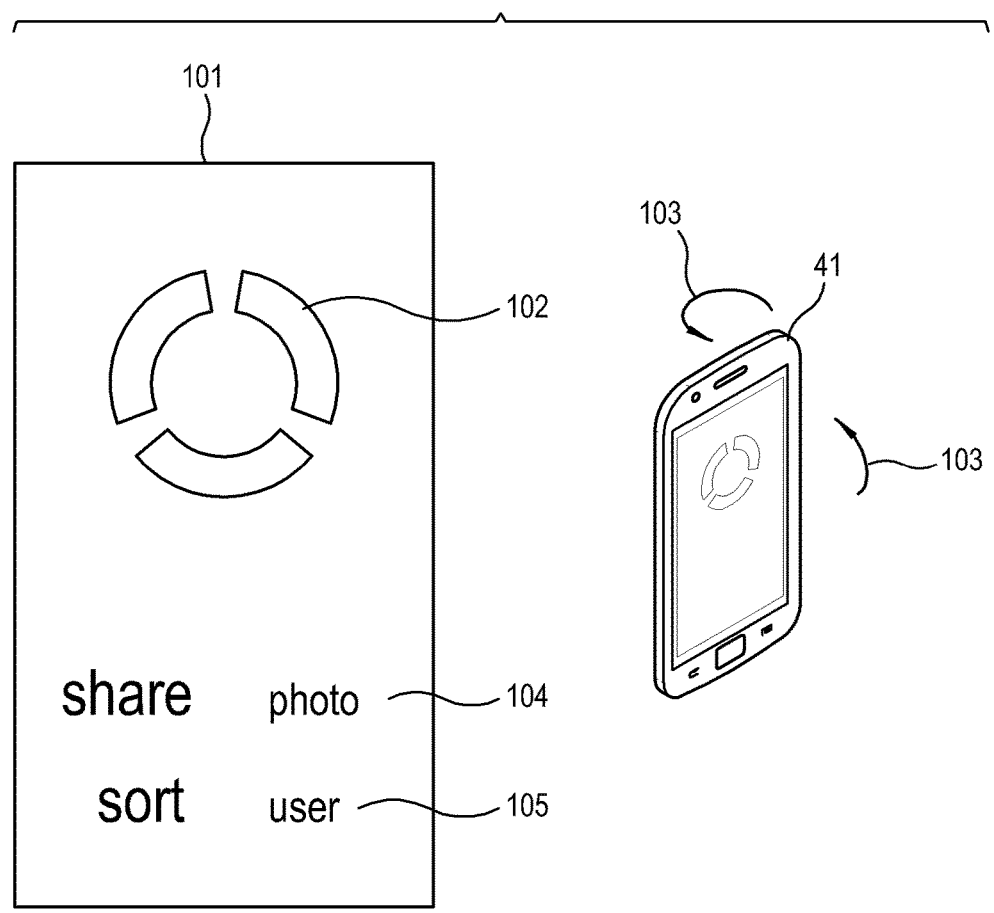
FIG. 10 is an example of the UI displayed on the user terminal according to an exemplary embodiment.

FIG. 10 shows another example of the UI displayed on the user terminal 12 according to an exemplary embodiment. FIGS. 11 to 19 are other examples of the UI displayed on the display apparatus 11 according to an exemplary embodiment. Regarding the display apparatus 11 and the user terminal 12 according to the exemplary embodiments shown in FIGS. 10 to 19, descriptions about the same or similar elements as those of the display apparatus 11 and the user terminal 12 described with reference to FIGS. 1 to 9 will be omitted.

As shown in FIG. 10, the first user terminal 41 may display a UI 101 for controlling reproduction of shared content. In an exemplary embodiment, the reproduction of the shared content involves various situations allowing a user 13 to use the shared content through the display apparatus 11. For example, the reproduction of the shared content may include reproducing a moving image, displaying a picture, playing music, providing relevant information about content, etc. through the display apparatus 11.

According to an exemplary embodiment, the UI 101 may include a cursor 102, and items 104 and 105 for selecting a category of shared content or sorting and/or arranging the shared content. A user 13 manipulates the cursor 102 shown in the UI 101 of the first user terminal 41 and makes the first user terminal 41 have a motion, thereby controlling the reproduction of the shared content displayed on the display apparatus 11. The first user terminal 41 sends information about the cursor 102 and the motion of the first user terminal 41 to the display apparatus 11, and the display apparatus 11 performs operations related to control for reproducing the content based on the information received from the first user terminal 41.

Figure 11:
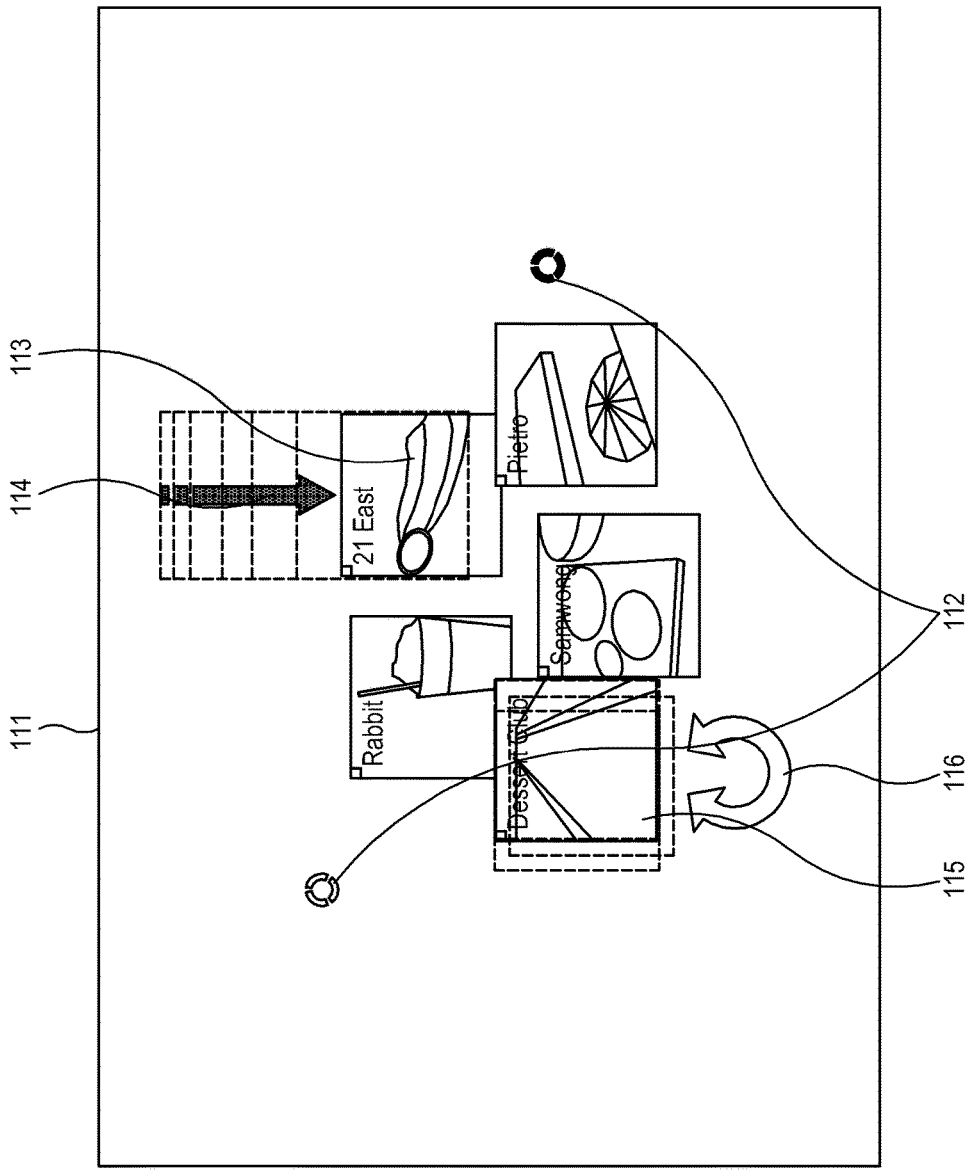
FIGS. 11, 12, 13, 14, 15, 16, 17, 18, 19, and 20 are examples of the UI displayed on the display apparatus according to an exemplary embodiment.

As shown in FIG. 11, the display apparatus 11 may display a UI 111 for controlling the reproduction of the shared content. The UI 111 displayed on the display apparatus 11 may include a cursor 112 and an item 113 showing the shared content. The cursors 112 are displayed corresponding to the first user terminal 41 and the second user terminal 42, respectively. The cursors 112 may be distinguished by colors respectively assigned to the users 13. The cursor 112 displayed on the display apparatus 11 may be shaped corresponding to the cursors 102 displayed on the UI 101 of the first and second user terminals 41 and 42.

The item 113 showing the shared content may include at least one of the thumbnail image, the name, and the description of the content. There are no limits to a pattern where the items 113 showing the plurality of pieces of shared content are arranged. In an exemplary embodiment, the items 113 may be randomly arranged. Alternatively, the item 113 showing the shared content according to an exemplary embodiment may be arranged to have various patterns such as a 3D-spherical pattern, etc.

Each item 113 showing the shared content may be displayed as if it falls from the top end of the UI 101 downward (reference numeral 114). The displayed items item 115 may be animated to move as if it sinks under water (reference numeral 116). The size of the item 113 showing the shared content may be determined based on the number of pieces of shared content to be displayed.

Figure 12:
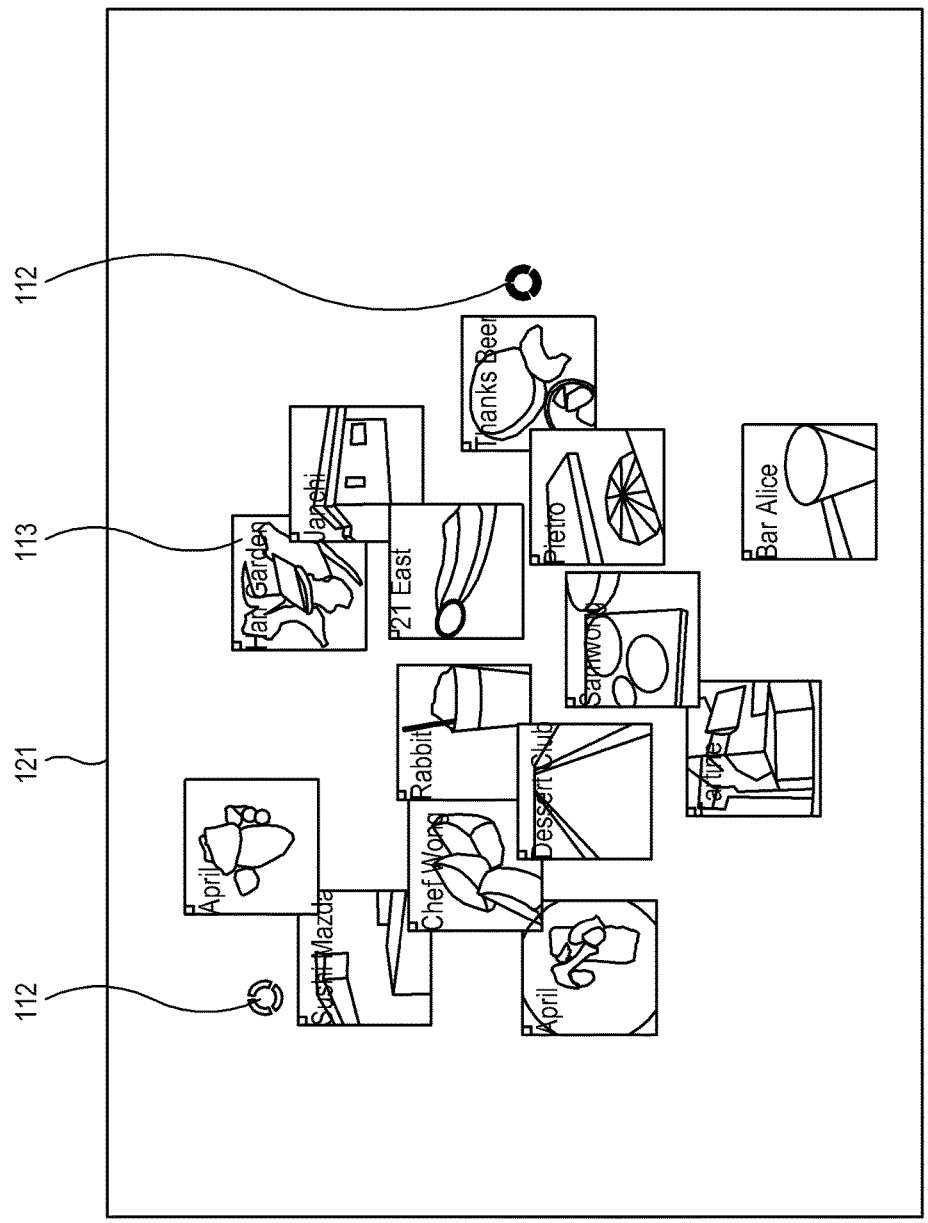

FIG. 12 shows a UI 121 displaying more pieces of shared content than those displayed on the UI 111 shown in FIG. 11. As shown in FIG. 12, the items 122 respectively corresponding to the shared content displayed on the UI 121 may be smaller than the items 113 of the shared content displayed on the UI 111 shown in FIG. 11. In addition, the display apparatus 11 may display images on the wallpapers of the UI 111 and UI 121, and wallpaper images may be enlarged or reduced in accordance with change in the size of items 113 and 122 of the shared content.

Referring back to FIG. 10, a user 13 may move the cursor 112 displayed on the display apparatus 11 by controlling the motion of the first user terminal 41. For example, if a user 13 inclines the first user terminal 41 in upward, downward, leftward and rightward directions 103, the display apparatus 11 may display the cursor 112 corresponding to the first user terminal 41 to move in a direction corresponding to the inclined direction 103 of the first user terminal 41. There are no limits to the method of moving the cursor 112 of the display apparatus 11 by manipulating the first user terminal 41, and various methods are possible.

According to an exemplary embodiment, a user 13 applies the motion control to the first user terminal 41 so that the item 113 of the shared content can be variously arranged on the display apparatus 11. For example, a user 13 may make the cursor 102 of the first user terminal 41 slide, or do the motion control of inclining the first user terminal 41 in the upward, downward, leftward and downward directions 103 in the state that the cursor 102 is touched and held. In this regard, the display apparatus 11 may display all the items 113 corresponding to the plurality of pieces of shared content arranged as shown in FIG. 11 or FIG. 12 to move upward, downward, leftward and rightward, to rotate in a horizontal or vertical direction and to zoom in or out. Thus, a user 13 arranges the item 113 of the content in various patterns, and more easily selects the desired shared content.

A user 13 may designate the item 113 of the shared content displayed on the display apparatus 11, thereby selecting the shared content desired to be reproduced. A user 13 points the item 113 of the shared content desired to be reproduced, with the cursor 112, and starts reproducing the shared content. A user 13 may use the cursor 112 to select and focus the item 113 of the shared content, to release the selection, or to scroll. The cursor 112 may be displayed with a color assigned to a user 13 who currently controls the cursor 112. The cursor 112 may repetitively get bigger and smaller as if it breathes, thereby arousing a user's interest.

Figure 13:
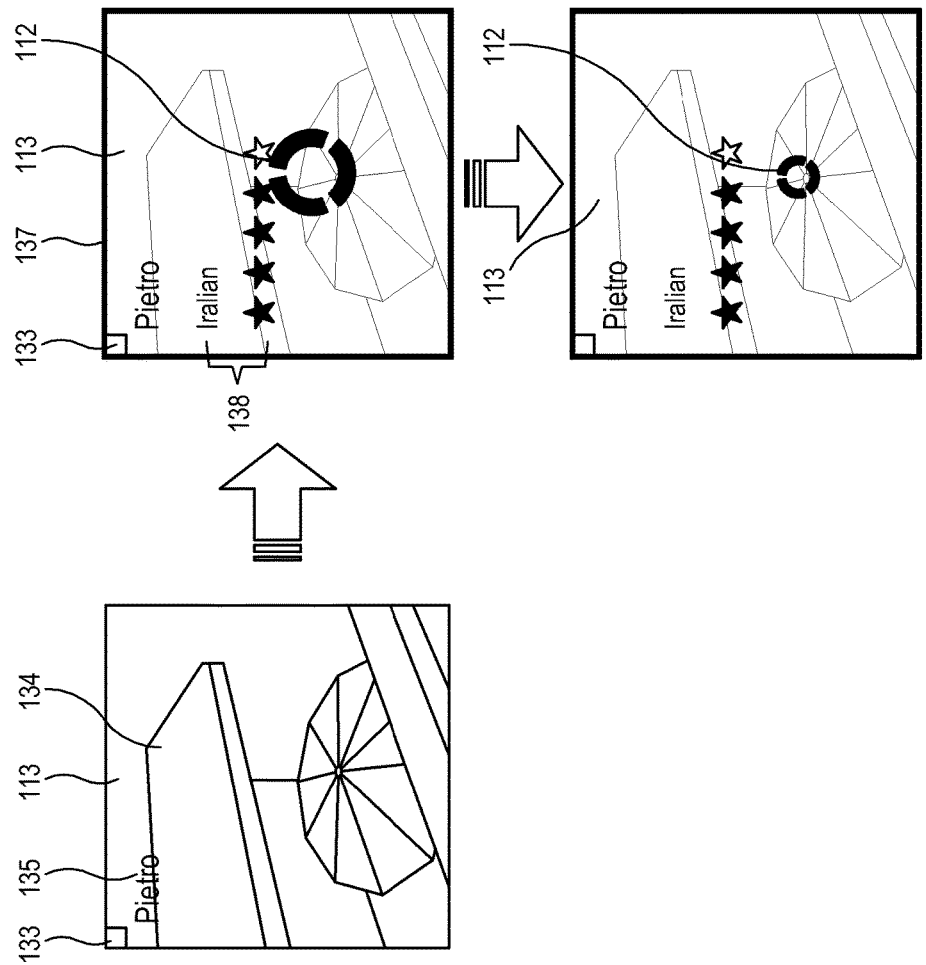
Figure 14:
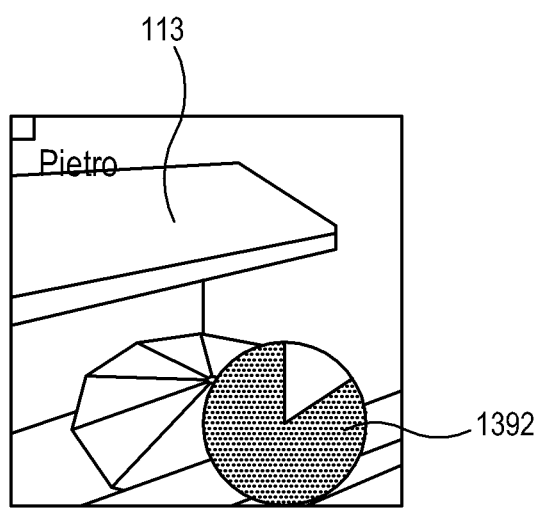

FIGS. 13 and 14 show details of the item 113 of certain shared content displayed on the UI 111, 121 shown in FIGS. 11 and 12. As shows in FIG. 13, the item 113 of the shared content is displayed to have a basic form as described with reference to FIGS. 11 and 12 before it is pointed with the cursor 112. Specifically, the item 113 of the shared content may be marked with an identifier 133 for indicating which user 13 the corresponding shared content belongs to. The color of the identifier 133 may be the same as the color assigned to the user 13 of the corresponding shared content. The item 113 of the shared content may display a thumbnail image 134 of the corresponding shared content. The item 113 of the shared content may display information 135 about a source of the corresponding shared content, i.e., a source from which the corresponding shared content is provided. According to an exemplary embodiment, the source information 135 of the shared content may be not displayed when the source is the first user terminal 41, but displayed only when the source is, for example, a web, an external device or the like content storage device 14 (see FIG. 1).

Next, the item 113 of the shared content may be highlighted to indicate that the item 113 is focused when the item 113 is pointed with the cursor 112 (see 137 in FIG. 13). The highlight 137 may be displayed to surround the edges of the item 113, and may, for example, be shaped as a rectangle. The highlight 137 may have the same color as the identifier 133 of the corresponding shared content. When the item 113 of the shared content is focused, additional information 138 of the shared content may be displayed. The additional information 138 of the shared content may include the title and description of the corresponding shared content, information provided by a certain service when it is connected to the certain service, etc. The information provided by the corresponding service may be, for example, given in the form of the number of stars, which indicates a level of recommending the content, as shown in FIG. 13.

Next, in the state that the item 113 of the shared content is focused, a user 13 may select the item 113 so that the shared content can be reproduced. Referring to FIG. 10, a user 13 may manipulate the cursor 102 of the first user terminal 41 to select the item 113 of the display apparatus 11.

As shown in FIG. 13, when the item 113 of the shared content is selected by an input of a user 13, the display apparatus 11 may display the cursor 112 on the item 113 to get smaller as if it grasps the item 113 like a hand of the user 13. Thus, a user 13 can more funnily select the shared content since the shape of the cursor 112 is varied depending on his/her manipulation.

Figure 15:
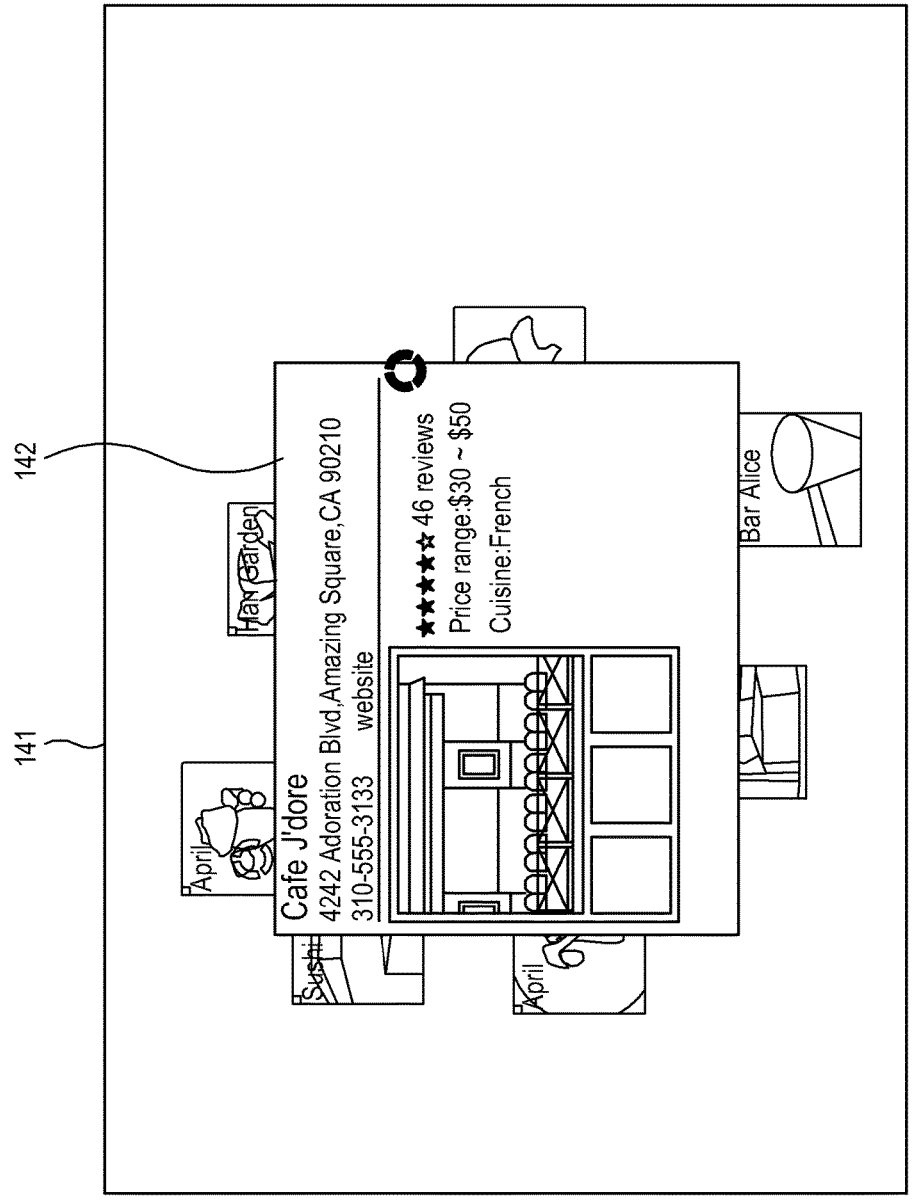

FIG. 15 shows an example of a UI 141 displayed on the display apparatus 11 according to an exemplary embodiment. If the item 113 of the shared content is selected in response to an input of a user 13, the display apparatus 11 reproduces shared content 142 corresponding to the selected item 113. FIG. 15 illustrates an example that information provided on a web is displayed as a type of reproducing the shared content 142. However, there are no limits to the type of reproducing the shared content. According to an exemplary embodiment, if the shared content is a moving image, the moving image may be reproduced. If the shared content is a still image, the still image may be displayed Likewise, the shared content may be reproduced variously in accordance with the kinds and formats of the shared content.

According to an exemplary embodiment, the display apparatus 11 may variously arrange and display the item 113 of the shared content.

Figure 16:
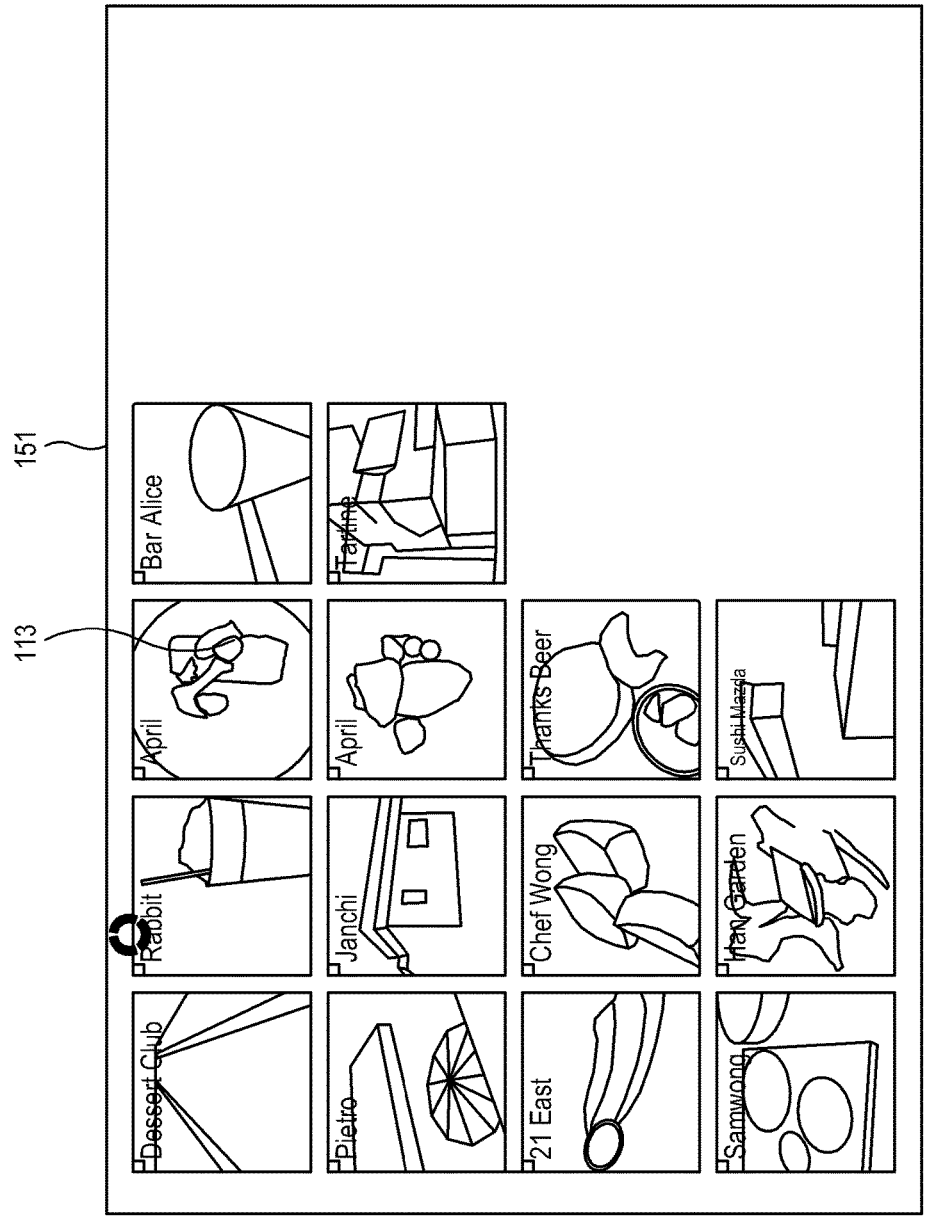
Figure 17:
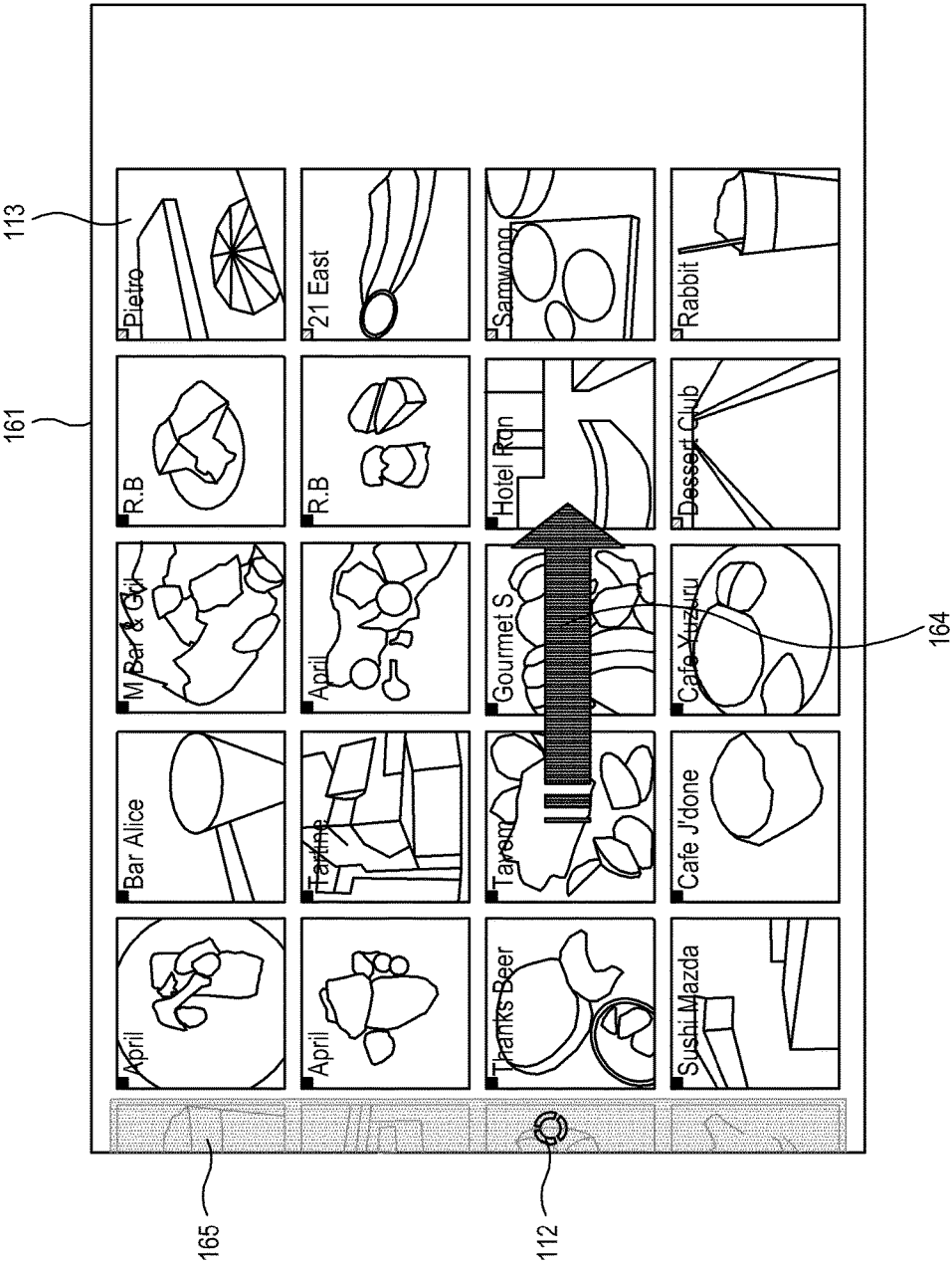

FIGS. 16 and 17 illustrate examples of UIs 151, 161 displayed on the display apparatus 11 according to an exemplary embodiment. As shown in FIGS. 16 and 17, items 113 of the shared content are arranged in the form of two-dimensional grid or matrix in the UIs 151 and 161. The display apparatus 11 may display the UI 151, 161 in response to an input of a user 14 to the first user terminal 41. The display apparatus 11 may switch between the arrangement of the item 113 corresponding to the shared content shown in FIGS. 11 and 12 and the arrangement of the item 113 corresponding to the shared content shown in FIGS. 16 and 17 in response to an input of a user 14 to the first user terminal 41. Thus, it is more convenient for a user 13 to select the shared content as desired since the items 113 of the shared content are variously arranged.

As shown in FIG. 17, if the cursor 112 reaches the edge of the screen, for example, the left edge in response to an input of a user 14 to the first user terminal 41, the display apparatus 11 scrolls all the items 113 of the currently displayed shared content rightward (reference numeral 164) so that one or more items 165 of the shared content not displayed yet can enter the screen. As an exemplary embodiment without limitation, if the cursor 112 corresponding to the plurality of users 13 is being displayed, the display apparatus 11 may allow the item 113 of the shared content to be movable only when the cursor 112 corresponding to all the plurality of users 13 reaches the edge. Thus, any user among the plurality of users 13 can have ample opportunities to view the item 113 of the shared content, and it is thus possible to improve a user's convenience.

According to an exemplary embodiment, the display apparatus 11 may sort and/or arrange the item 113 of the shared content according to categories.

Figure 18:
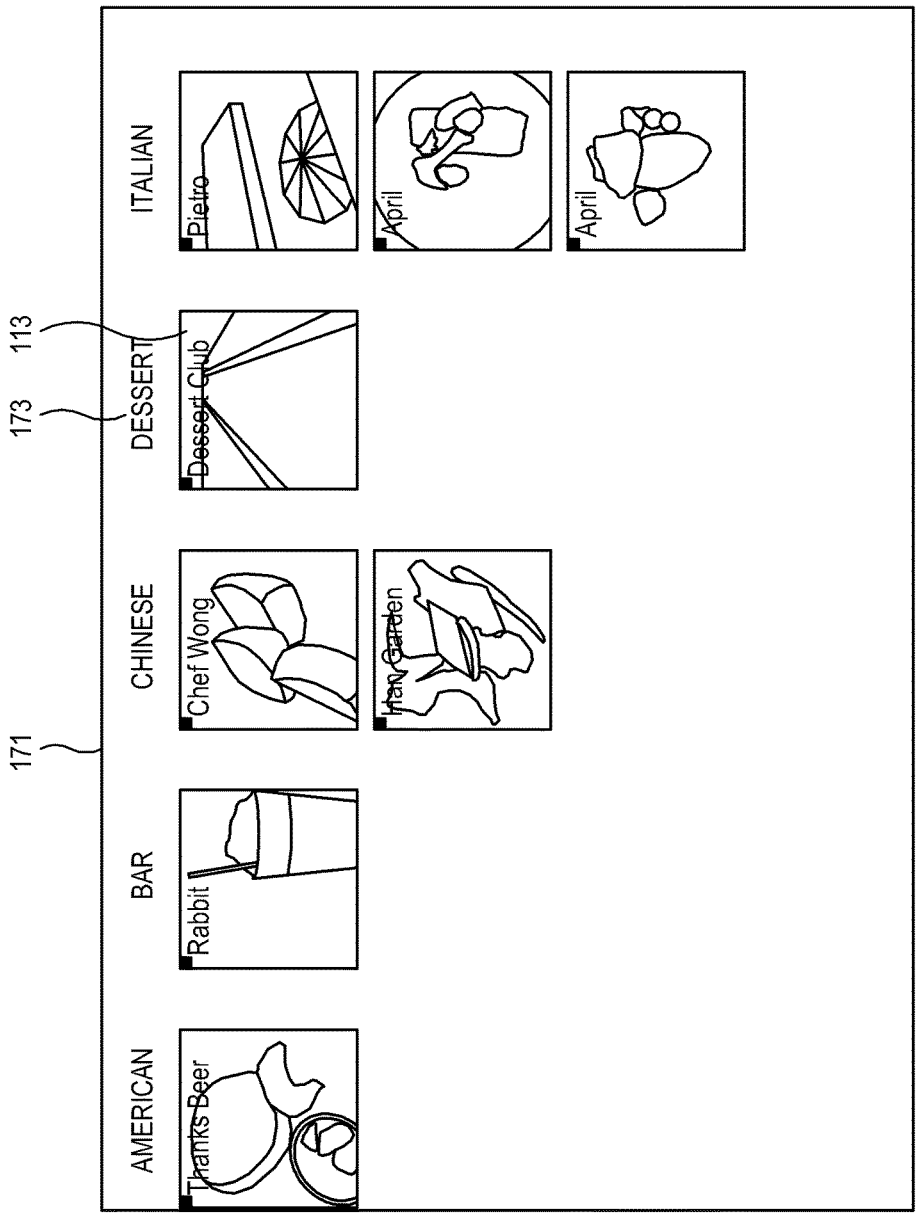

FIG. 18 illustrates an example of a UI 171 displayed on the display apparatus 11 according to an exemplary embodiment. As shown in FIG. 18, one or more items 113 of shared content are sorted and/or arranged according to categories in the UI 171. The UI 171 may show the respective names 173 of the categories. In the UI 171, the categories are horizontally arranged, and the items 113 of the shared content that belongs to each category are vertically arranged. The sorting and/or arranging method is not limited to the example shown in FIG. 17, and may vary variously.

Referring back to FIG. 10, a user 13 may select the category of the shared content desired to be sorted and/or arranged, using the items 104 and 105 of the first user terminal 41. The selectable categories of the shared content may, for example, include a picture, a moving image, music, web information, etc. as the kind of content, or a user, a genre, a liking, time, etc. as the method of sorting the content. There are no limits to the selectable categories, and the selectable categories may include any category for sorting or arranging the shared content. The first user terminal 41 sends the display apparatus 11 the information about the category of the shared content selected by a user 13. The display apparatus 11 displays the items 113 of the shared content corresponding to the category selected by a user 13 to be sorted and/or arranged based on the information received from the first user terminal 41. Thus, a user 13 can more easily select the shared content as desired since the items 113 of the shared content are variously sorted and/or arranged.

According to an exemplary embodiment, the display apparatus 11 may display the item 113 of the shared content to be arranged at a certain position on the wallpaper image.

Figure 19:
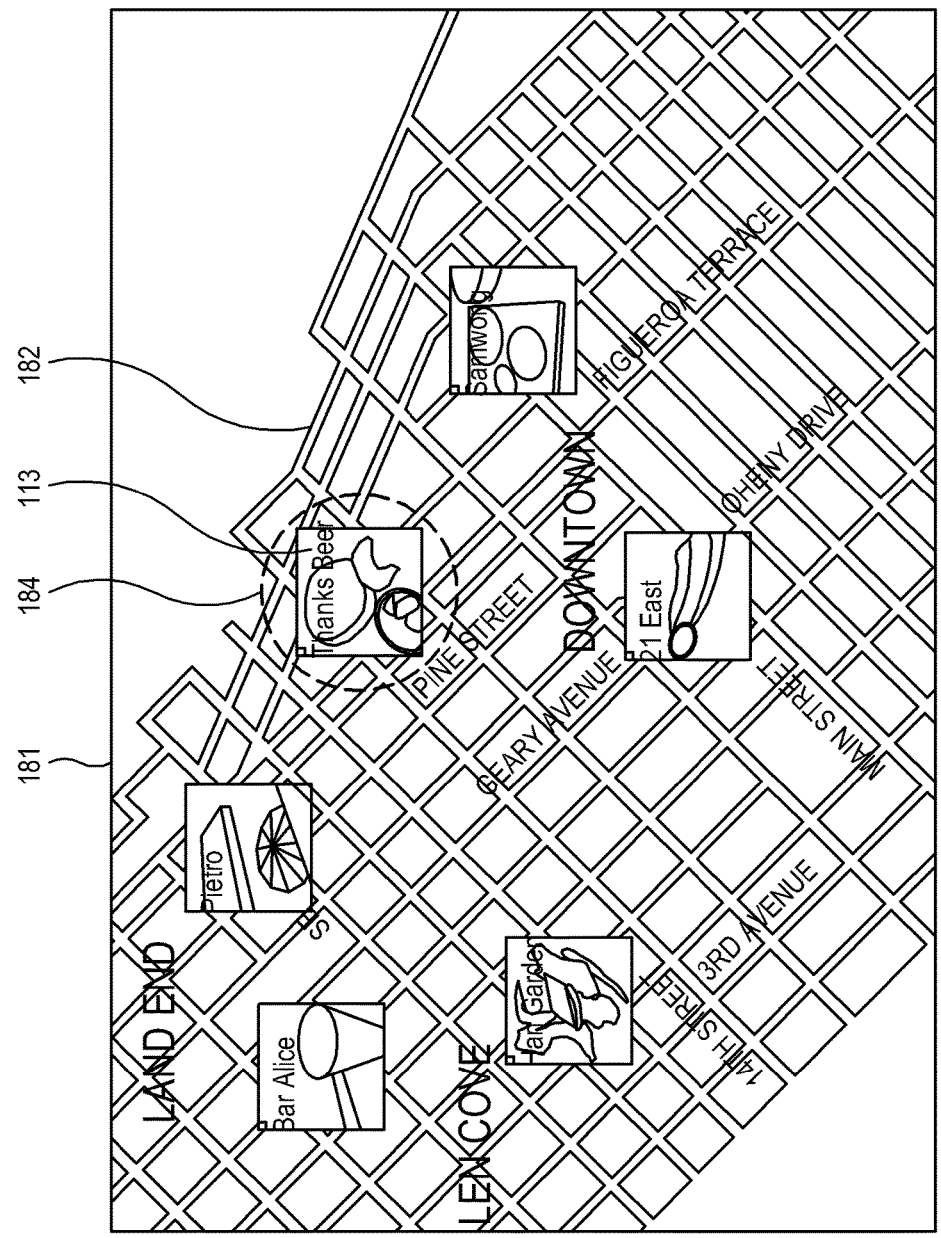

FIG. 19 shows an example of a UI 181 displayed on the display apparatus 11 according to an exemplary embodiment. As shown in FIG. 19, the UI 181 may include a wallpaper image 182, and an item or items 113 of the shared content arranged on the wallpaper image 182. In an exemplary embodiment, the wallpaper image 182 may be a map image, but not limited thereto. Each item 113 of the shared content is displayed at a certain position 184 matching with the shared content on the map image, i.e., the wallpaper image 182. For example, if the shared content is information about a restaurant, the corresponding item 113 may be displayed at the position 184 corresponding to a certain point on the map 182 where the restaurant is placed. A user 13 manipulates the first user terminal 41 to move the map, i.e., the wallpaper image 182 upward, downward, leftward and rightward, or enlarge or reduce the map, thereby searching for the item 113 of the shared content as desired. Thus, it is more convenient for a user 13 to select the shared content as desired.

According to an exemplary embodiment, the display apparatus 11 may provide a function of searching the shared content.

Figure 20:
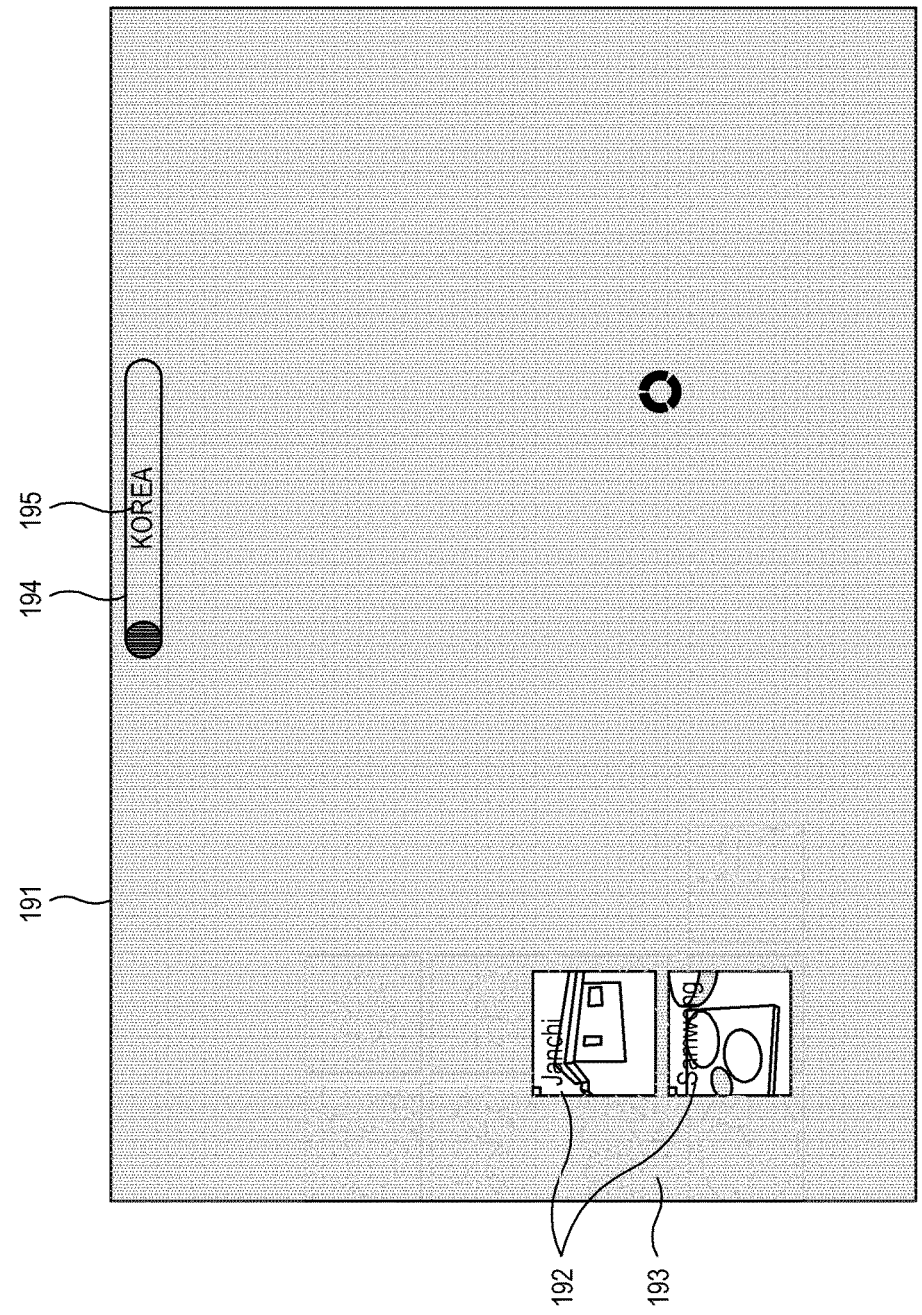

FIG. 20 illustrates an example of a UI 191 displayed on the display apparatus 11 according to an exemplary embodiment. As shown in FIG. 20, the UI 191 may include items 192 and 193 of the shared content, and a search box 194. The display apparatus 11 may display a search word 195, for example, a country "Korea" corresponding to the shared content desired to be searched by a user 13 in the search box 194 in response to a user's input to the first user terminal 41. The display apparatus 11 searches the shared content corresponding to the completely input search word 195, and displays the item 192 of the searched shared content in the UI 191. The display apparatus 11 may display the item 192 of the searched shared content to be more emphasized than the item 193 of another shared content being displayed before the search, so that a user 13 can easily recognize the search result. For example, the item 192 of the searched shared content may be arranged in front, and the item 193 of another shared content may be arranged in back. The item 192 of the searched shared content may be activated, but the item 193 of another shared content may be inactivated. The inactivated item 193 of another shared content may be displayed lightly or darkly.

A user 13 may start a search function for the shared content through the first user terminal 41 and input a search word for the shared content desired to be searched. Referring back to FIG. 10, according to an exemplary embodiment, a user 13 may use the item 105 of the first user terminal 41 to start the search function, but not limited thereto. When the search function begins, the first user terminal 41 displays a UI for inputting a search word on the screen of the first user terminal 41 so that a user 13 can input the search word. According to an exemplary embodiment, the first user terminal 41 may receive a search word based on a voice input of a user 13, e.g., via a microphone provided in the user terminal.

Referring back to FIG. 20, the display apparatus 11 may display the search box 194 with the same color as that assigned to a user 13 who currently uses the search function, and it is thus easy to know who uses the search function. If a certain user 13 starts the search function, the display apparatus 11 suspends cursor control corresponding to the certain user 13, and displays the search box 194. While a certain user 13 is using the search function, the display apparatus 11 may prevent another user 13 from using the search function. The search function assigned to a certain user 13 may be valid until the corresponding user 13 inputs the termination of the search function or until predetermined time out elapses.

When the search function assigned to a certain user 13 is terminated, the display apparatus 11 releases the display of the search box 194, and resumes the cursor control corresponding to the user 13. Thus, it is more convenient for a user 13 to select a desired shared content through the search function for the shared content.

According to an exemplary embodiment, if a certain user 13 makes a request for reproducing the shared content, the display apparatus 11 may start reproducing the request shared content after a predetermined standby time elapses from a requesting point of time. Thus, another user 13 can have opportunities to select the shared content as desired by her during the standby time. The standby time may be individually applied to each piece of the shared content, and time is independently counted from when a request for reproducing each piece of the shared content is made.

Referring to FIG. 14, the display apparatus 11 may display a timer 1392 for showing the standby time on an item 113 of the shared content requested to be reproduced.

The display apparatus 11 may reproduce only the shared content, of which the standby time is first over, among the plurality of pieces of shared content requested to be reproduced. The display apparatus 11 may reproduce the plurality of pieces of shared content requested to be reproduced, in order that the standby times thereof are ended. With regard to one piece of the shared content, the plurality of users 13 may make repetitive requests. In this case, the standby time may become shorter or elapse faster as the number of users 13 who make requests for the reproduction increases. In other words, the shared content requested by more users 13 may be preferentially reproduced. The display apparatus 11 may enlarge the timer 1392, three-dimensionally display the timer 1392 or give the like visual effects as the shared content is more repetitively requested by the plurality of users 13. Thus, according to an exemplary embodiment, the shared content desired by many users is preferentially reproduced by taking the liking of the number of users into account.

Figure 21:
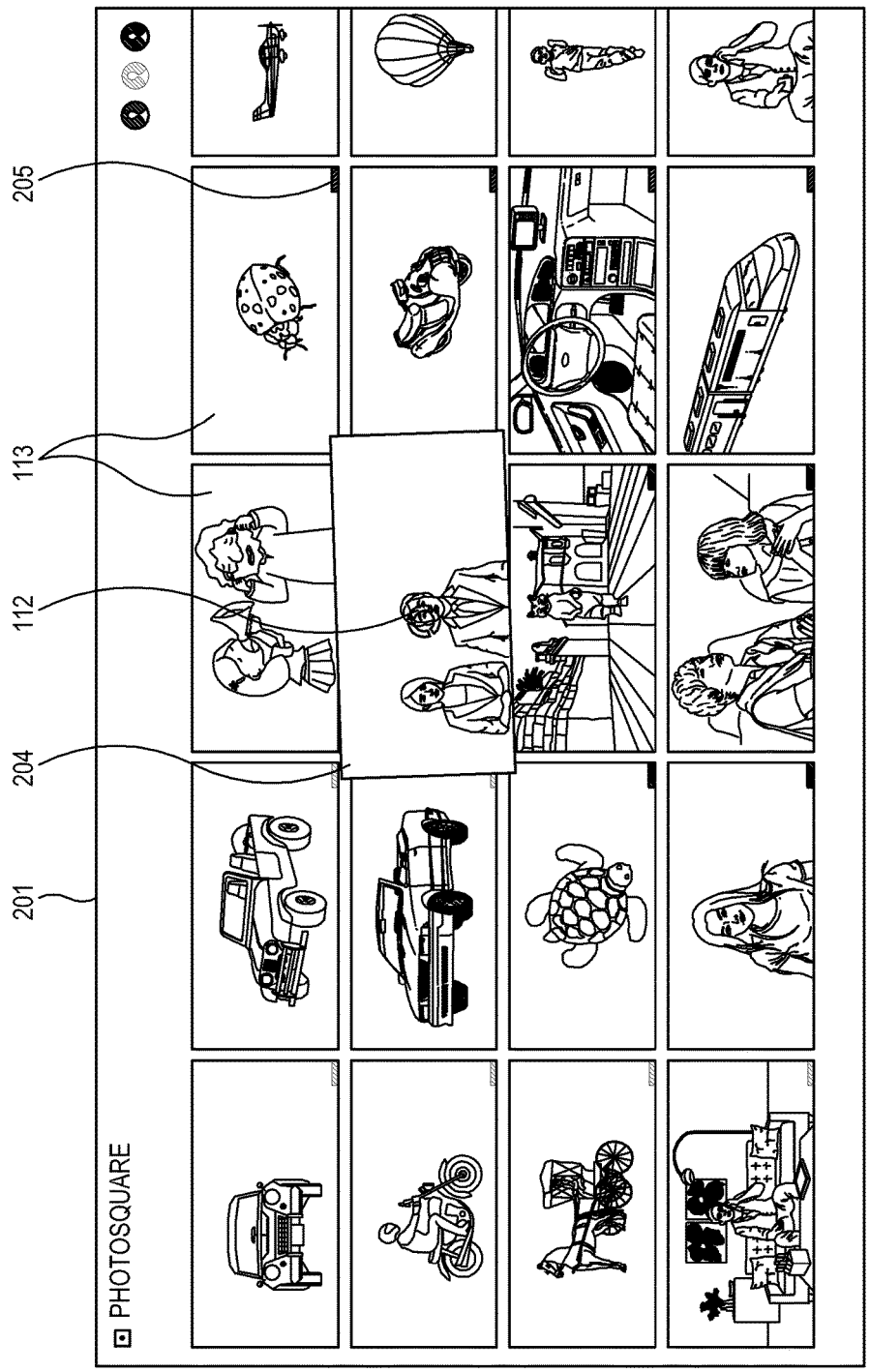
FIGS. 21 and 22 are examples of the UI displayed on the display apparatus according to an exemplary embodiment.
Figure 22:
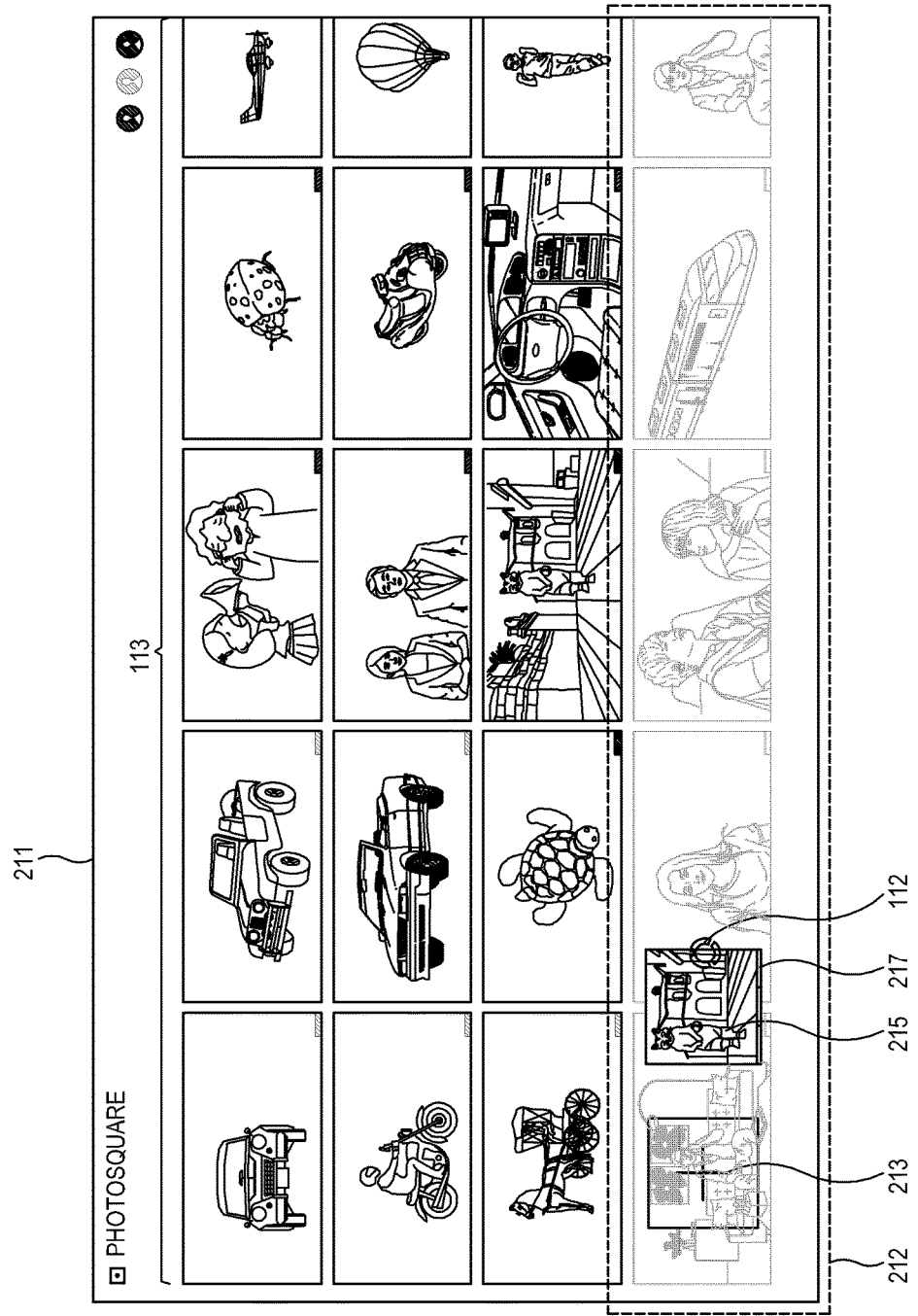

FIGS. 21 and 22 are still other examples of the UI displayed on the display apparatus 11 according to an exemplary embodiment. Regarding the display apparatus 11 and the user terminal 12 shown in FIGS. 21 and 22, descriptions about the same or similar elements to those of the display apparatus 11 and the user terminal 12 shown in FIGS. 1 to 20 will be omitted.

The UI 201 shown in FIG. 21 includes a cursor 112, an item or items 113 showing shared content and an item 205 indicating a user and/or liking. According to an exemplary embodiment, the shared content shown in FIG. 21 may, for example, be a picture, but not limited thereto. The items 113 corresponding to a plurality of pictures may, for example, be arranged in a 2D grid or matrix. Each item 113 of the shared content additionally includes the item 205 for indicating a user and/or liking. The item 205 is displayed with color assigned to each user 13, and thus informs which user terminal shares the corresponding picture. The item 205 is shaped like a bar, so that the liking of the picture can be indicated by the length of the bar.

The display apparatus 11 moves the cursor 112 in response to a user's input received from the user terminal 12. The display apparatus 11 focuses an item 204 of the picture where the cursor 112 is currently positioned. For example, the item 204 of the currently focused picture may be displayed to be bigger than other items 113 and may be inclined at a predetermined angle. According to an exemplary embodiment, referring back to FIG. 10, the first user terminal 41 may make the cursor 102 become larger if a user 13 touches the UI 101 while the display apparatus 11 displays the item 204 of the picture. In this case, the display apparatus 11 may make the cursor 112 to be smaller. Thus, the circle of the cursor 102 displayed on the first user terminal 41 is enlarged as if it is pressed, and the cursor 112 displayed on the display apparatus 11 is reduced as if it grasps the picture, thereby giving a more interesting control experience to a user. Alternatively, the cursor 102 displayed on the first user terminal 41 may become bigger or smaller in accordance with strength by which a user 13 touches the UI 101.

Referring to FIG. 22, the display apparatus 11 may display an editing area 212 in a lower end of a UI 211 in response to a user's input received from a user terminal 12. The editing area 212 may display an item 213 for creating an album. The display apparatus 11 displays an item 215 of an album to be edited, if a user 13 selects the item 213 through the cursor 112. Each user 13 may move an item or items 113 of a desired picture to the item 215 of the album by drag and drop or the like method. Thus, the plurality of users 13 can make a shared picture album with pictures desired by them. The display apparatus 11 may additionally display an item 217 to the item 215 of the album, thereby indicating a user of a picture included in this album. The item 217 is displayed with a color (or colors) assigned to a user 13 of each picture included in the album, and it is thus easy to know whose picture this album includes. The item 217 may be shaped like a bar including color bars, and the length of each color bar may be proportional to the number of pictures of each user 13 included in an album if this album includes the pictures corresponding to the plurality of users 13. Therefore, it is easy to know information about the users who create the album.

FIG. 23 is another example of the UI displayed on the user terminal according to an exemplary embodiment. Regarding UIs 221 and 222 of the user terminals 12 shown in FIG. 22, the same or similar elements to those of the UIs 71 and 81 of the first user terminal 41 described with reference to FIGS. 7 and 8 will be omitted. As shown in FIG. 22, the UIs 221 and 222 are shaped like circles. For example, the user terminal 12 may be a smartwatch or the like. The UIs 221 and 222 respectively show different control states, and include items 225 and 226 corresponding to the control states. The items 225 and 226 showing the control states may, for example, include graphics of a play and a loudspeaker, but not limited thereto. The UIs 221 and 222 may be switched each other in response to an input of a user 13. For example, if a user 13 swipes left or right over the UI 221, 222, or presses the UI 221, 222 by strength stronger than a predetermined level, the UIs 221 and 222 are switched each other.

The UI 221, 222 includes a wheel 223 provided along a rim of a screen. A user 13 may touch and turn the wheel 223 in a clockwise or counterclockwise direction 224. If a user 13 turns the wheel 223, dots of forming the wheel 223 are displayed as if they are turned in a control direction of a user 13. In the state that the UI 221 is displayed, a user 13 may select desired content among the items 63 of the shared content displayed on the display apparatus 11 as shown in FIG. 6 while turning the wheel 223. The display apparatus 11 may move the focus 65 over the items 63 corresponding to the plurality of pieces of shared content in accordance with a turning direction 224 of the wheel 223 by an input of a user 13. In the state that the item 65 of the desired shared content is focused, a user 13 may select the reproduction of the corresponding shared content. For example, it may be selected to reproduce the shared content corresponding to the focused item 65 if a user 13 selects the item 225 of the UI 221. Alternatively, it may be selected to reproduce the shared content corresponding to the focused item 65 if a user 13 presses the wheel 223 with strength stronger than a predetermined level while turning the wheel 223.

If a user 13 selects the item 225 of the UI 221 while the selected shared content is being reproduced, the reproduction of this content is suspended. In the state that the reproduction of the content is suspended, if a user 13 selects the item 225 of the UI 221, the reproduction of the corresponding content is resumed. While the UI 222 is being displayed, a user 13 may control volume or the like of the shared content being reproduced while turning the wheel 223.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention. Specifically, at least one of the features of the display apparatus 11 and the user terminal 12 described with reference to FIGS. 1 to 9 and FIG. 23 may be applied to the exemplary embodiments of the display apparatus 11 and the user terminal 12 described with reference to FIGS. 10 to 20 or the exemplary embodiments of the display apparatus 11 and the user terminal 12 described with reference to FIGS. 21 to 22, and vice versa. For example, the features of the visualizer 91 displayed distinguishably according to users 13, described with reference to FIG. 9 may be applied to the exemplary embodiments of the display apparatus 11 and the user terminal 12 respectively described with reference to FIGS. 10 to 20 and/or FIGS. 21 to 22. In addition, the features of the timer 1392 indicating the standby time from when the reproduction is requested to the time when the reproduction is fulfilled, described with reference to FIG. 14 may be applied to the exemplary embodiments of the display apparatus 11 and the user terminal 12 respectively described with reference to FIGS. 1 to 9 and FIG. 23 or FIGS. 21 and 22. Besides, the features described in a certain exemplary embodiment are applicable to the other exemplary embodiments as long as they are not contradictory to each other.

As described above, according to an exemplary embodiment, various, convenient and interesting interfaces for sharing content are provided to a plurality of users, thereby allowing a user to experience worthwhile sharing activities.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
   a display;
   a communicator configured to communicate with a plurality of external apparatuses, which respectively provide a plurality of contents; and
   a processor configured to:
   based on receiving information relating to contents among the plurality of contents from external apparatuses, respectively, through the communicator, identify the external apparatuses that transmitted the information, among the plurality of external apparatuses,
   control the display to display a user interface (UI) comprising the contents respectively received from the identified external apparatuses, and
   control the display to display, on the UI, reproduction states of the contents to be visually distinguishable according to states of inputs of users of the received contents, the inputs being received through the identified external apparatuses, respectively.

2. The display apparatus according to claim 1, wherein the processor is further configured to control the display to display the contents to be visually distinguishable by colors respectively assigned to the users.

3. The display apparatus according to claim 1, wherein the processor is further configured to control the display to display, on the UI, visualizers provided distinguishably according to the users and varied in a visual effect depending on the states of the inputs of the users.

4. The display apparatus according to claim 1, wherein the processor is further configured to control the display to display, on the UI, a cursor for selecting the contents, and make the cursor be changed in shape as one of the contents is selected or unselected by an input of one of the users.

5. The display apparatus according to claim 1, wherein the processor is further configured to control the display to display, on the UI, a wallpaper image, and arrange at least one content among the contents at a certain position matching the at least one content with a corresponding item on the wallpaper image.

6. The display apparatus according to claim 1, wherein the processor is further configured to control the display to additionally display a timer showing a lapse of a standby time based on a request for reproducing one of the contents from at least one of the users, and start reproducing the one of the contents when the standby time is elapsed.

7. The display apparatus according to claim 6, wherein the processor is further configured to make the standby time shorter as more of the users make a request for reproducing a same content.

8. The display apparatus according to claim 6, wherein the processor is further configured to control the display to display an image of the timer to become bigger as more of the users make a request for reproducing a same content.

9. The display apparatus according to claim 1, wherein the processor is further configured to control the display to display, on the UI, an album comprising two or more pieces of the contents selected by inputs of the users, and control the display to display information about the users corresponding to the two or more of pieces of the contents included in the album.

10. A method comprising:
connecting and communicating with a plurality of external apparatuses, which respectively provide a plurality of contents;
based on receiving information relating to contents among the plurality of contents from external apparatuses, respectively, identifying the external apparatuses that transmitted the information, among the plurality of external apparatuses;
displaying a user interface (UI) comprising the contents respectively received from the identified external apparatuses; and
displaying, on the UI, reproduction states of the contents to be visually distinguishable according to states of inputs of users of the received contents, the inputs being received through the identified external apparatuses, respectively.

11. The method according to claim 10, wherein the displaying the UI comprises:
displaying, on the UI, the contents to be visually distinguishable by colors respectively assigned to the users.

12. The method according to claim 10, wherein the displaying the reproduction states comprises:
displaying, on the UI, visualizers provided distinguishably according to the users and varied in a visual effect depending on the states of the inputs of the users.

13. The method according to claim 10, further comprising:
displaying, on the UI, a wallpaper image; and
arranging at least one content among the contents at a certain position matching the at least one content with a corresponding item on the wallpaper image.

14. The method according to claim 10, further comprising:
additionally displaying, on the UI, a timer showing a lapse of a standby time based on a request for reproducing one of the contents being received from at least one of the users; and
starting reproducing the one of the contents when the standby time is elapsed.

15. A user terminal comprising:
a display comprising;
a communicator configured to communicate with a plurality of external apparatuses which respectively provide a plurality of contents; and
a processor configured to:
based on receiving information relating to contents among the plurality of contents from external apparatuses, respectively, through the communicator, identify the external apparatuses that transmitted the information, among the plurality of external apparatuses,
control the display to display a first user interface (UI) comprising the contents respectively received from the identified external apparatuses,
control the first UI to display reproduction states of the contents to be visually distinguishable according to users of the contents received from the identified external apparatuses, respectively,
based on a user selection input through the first UI, transmit, via the communicator, information about content selected by the user selection input among the contents, to at least one of the plurality of external apparatuses,
control the display to display a second UI comprising a cursor for controlling reproduction of the content corresponding to the information transmitted to the least one of the plurality of external apparatuses, and
transmit, via the communicator, a user input received through the cursor to the least one of the plurality of external apparatuses, so that the least one of the plurality of external apparatuses receives the transmitted user input and reproduces the content.

16. The user terminal according to claim 15, further comprising a sensor configured to sense an inclination of the user terminal,
wherein the
processor is further configured to control the display to display the content selected by the user selection input at an edge area of the first UI based on the inclination of the user terminal.

17. The user terminal according to claim 15, wherein the processor is further configured to control the cursor to be changed in size as the content displayed on the least one of the plurality of external apparatuses is selected or unselected.

18. The user terminal according to claim 15, wherein the first UI provides a first search function configured to receive an input for searching a storage unit where data of the content is stored,
the second UI provides a second search function configured to receive an input for searching the content displayed on the least one of the plurality of external apparatuses, and
the processor is further configured to control the communicator to transmit the input received using at least one from among the first search function and the second search function, to the least one of the plurality of external apparatuses.

19. A non-transitory computer-readable medium storing a computer program which, when executed by a processor of a display apparatus, causes the display apparatus to execute a method comprising:
connecting and communicating with a plurality of external apparatuses which respectively provide a plurality of contents;
based on receiving information relating to contents among the plurality of contents from external apparatuses, respectively, identifying the external apparatuses that transmitted the information, among the plurality of external apparatuses,
displaying, on a screen of the display apparatus, a user interface (UI) comprising the contents respectively received from the identified external apparatuses; and
displaying, on the UI, reproduction states of the contents to be visually distinguishable according to states of inputs of users of the received contents, the inputs being received through the identified external apparatuses, respectively.

20. An apparatus comprising:
a display apparatus configured to:
- based on receiving information relating to contents among a plurality of contents from external apparatuses among a plurality of external apparatuses respectively, identify the external apparatuses that transmitted the information,
- display a first user interface (UI) comprising the contents respectively received from the identified external apparatuses, and
- control the first UI to display reproduction states of the contents to be visually distinguishable according to the users of the contents received from the identified external apparatuses, respectively, wherein the at least one of the plurality of external apparatuses is configured to:
- display a second UI,
- transmit, to the display apparatus, information about content selected by a first input of one of the users received through the second UI, and
- based on a second input of the one of the users for controlling reproduction of the content, transmit the second input to the display apparatus, wherein the display apparatus is further configured to receive the second input and reproduce the content based on the second input.

21. The display apparatus according to claim 1, wherein the processor is further configured to control the display to display the contents to be visually distinguishable by graphical representations respectively assigned to the users, and vary a display of the graphical representations based on the states of the inputs of the users, respectively.

* * * * *